US010681333B2

United States Patent
Cole et al.

(10) Patent No.: US 10,681,333 B2
(45) Date of Patent: Jun. 9, 2020

(54) 3D VIDEO ENCODING AND DECODING METHODS AND APPARATUS

(71) Applicant: NextVR Inc., Newport Beach, CA (US)

(72) Inventors: David Cole, Laguna Beach, CA (US); Alan McKay Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 414 days.

(21) Appl. No.: 15/225,449

(22) Filed: Aug. 1, 2016

(65) Prior Publication Data

US 2017/0094247 A1 Mar. 30, 2017

Related U.S. Application Data

(63) Continuation of application No. 13/533,462, filed on Jun. 26, 2012, now Pat. No. 9,485,494, which is a continuation-in-part of application No. 13/443,864, filed on Apr. 10, 2012, now Pat. No. 9,407,902.

(60) Provisional application No. 61/652,111, filed on May 25, 2012, provisional application No. 61/473,809, filed on Apr. 10, 2011.

(51) Int. Cl.
| | |
|---|---|
| *H04N 13/189* | (2018.01) |
| *H04N 13/106* | (2018.01) |
| *H04N 19/597* | (2014.01) |
| *H04N 19/85* | (2014.01) |
| *H04N 19/51* | (2014.01) |
| *H04N 13/139* | (2018.01) |
| *H04N 13/161* | (2018.01) |

(52) U.S. Cl.
CPC ......... *H04N 13/189* (2018.05); *H04N 13/106* (2018.05); *H04N 13/139* (2018.05); *H04N 13/161* (2018.05); *H04N 19/51* (2014.11); *H04N 19/597* (2014.11); *H04N 19/85* (2014.11)

(58) Field of Classification Search
CPC ...... H04N 19/20; H04N 19/106; H04N 19/30; H04N 19/597; H04N 19/85
USPC .......................................................... 348/43
See application file for complete search history.

(56) References Cited

U.S. PATENT DOCUMENTS

| | | | | |
|---|---|---|---|---|
| 6,836,298 B2 * | 12/2004 | Song | ..................... | H04N 3/2335 348/745 |
| 7,443,400 B2 * | 10/2008 | Matskewich | .......... | G09G 5/246 345/467 |
| 8,502,862 B2 * | 8/2013 | Turner | ................. | H04N 13/261 348/46 |

(Continued)

*Primary Examiner* — Edemio Navas, Jr.
*Assistant Examiner* — Jimmy S Lee
(74) *Attorney, Agent, or Firm* — Straub & Straub; Michael P. Straub; Stephen T. Straub

(57) ABSTRACT

Methods and apparatus relating to encoding and decoding stereoscopic (3D) image data, e.g., left and right eye images, are described. Various pre-encoding and post-decoding operations are described in conjunction with difference based encoding and decoding techniques. In some embodiments left and right eye image data is subject to scaling, transform operation(s) and cropping prior to encoding. In addition, in some embodiments decoded left and right eye image data is subject to scaling, transform operations(s) and filling operations prior to being output to a display device. Transform information and/or scaling information may be included in a bitstream communicating encoded left and right eye images. The amount of scaling can be the same for an entire scene and/or program.

13 Claims, 18 Drawing Sheets

(56) References Cited

U.S. PATENT DOCUMENTS

| | | | | |
|---|---|---|---|---|
| 8,692,868 B2* | 4/2014 | Chang | .................. | H04N 13/139 |
| | | | | 348/43 |
| 8,761,504 B2* | 6/2014 | Hirakawa | ............. | G06T 1/0007 |
| | | | | 348/273 |
| 9,313,526 B2* | 4/2016 | Bivolarsky | .......... | H04N 19/105 |
| 2011/0134217 A1* | 6/2011 | Neuman | .............. | H04N 13/139 |
| | | | | 348/43 |
| 2011/0194756 A1* | 8/2011 | Morifuji | .............. | H04N 13/156 |
| | | | | 382/154 |
| 2012/0044990 A1* | 2/2012 | Bivolarsky | .......... | H04N 19/105 |
| | | | | 375/240.03 |

* cited by examiner

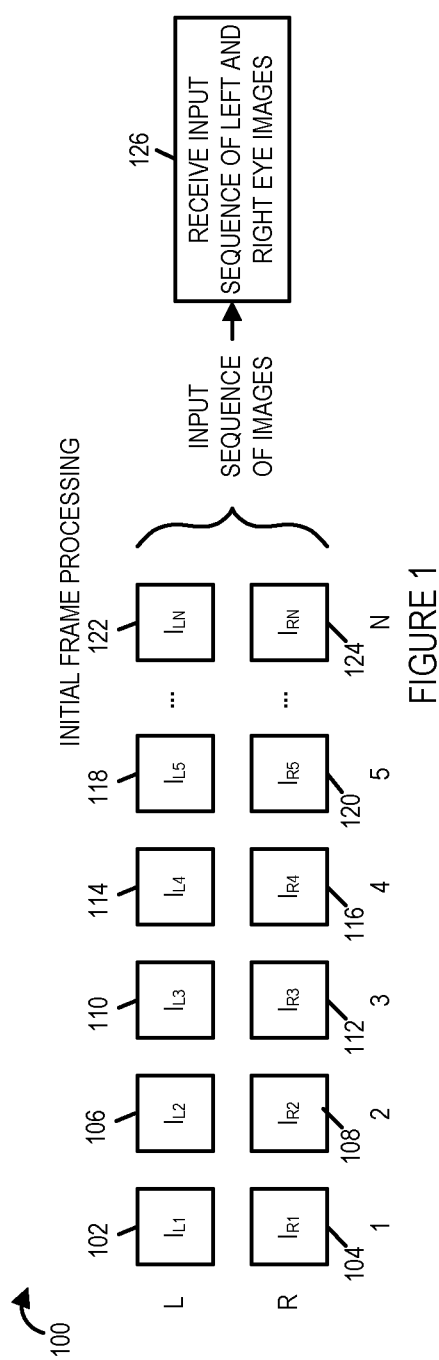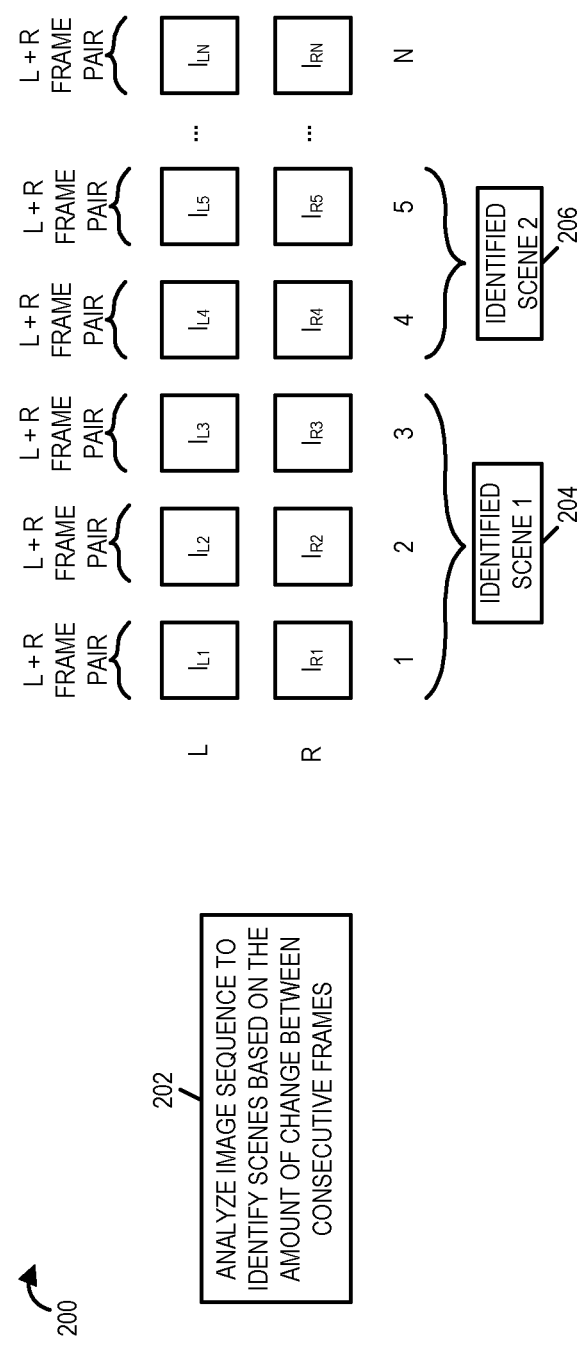

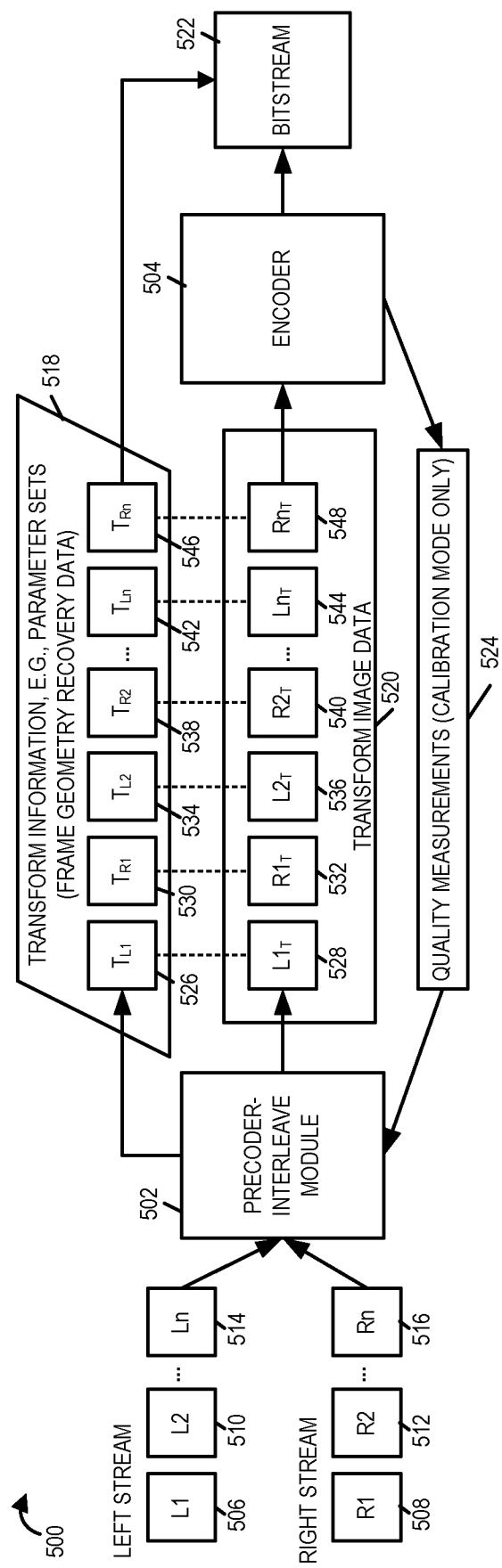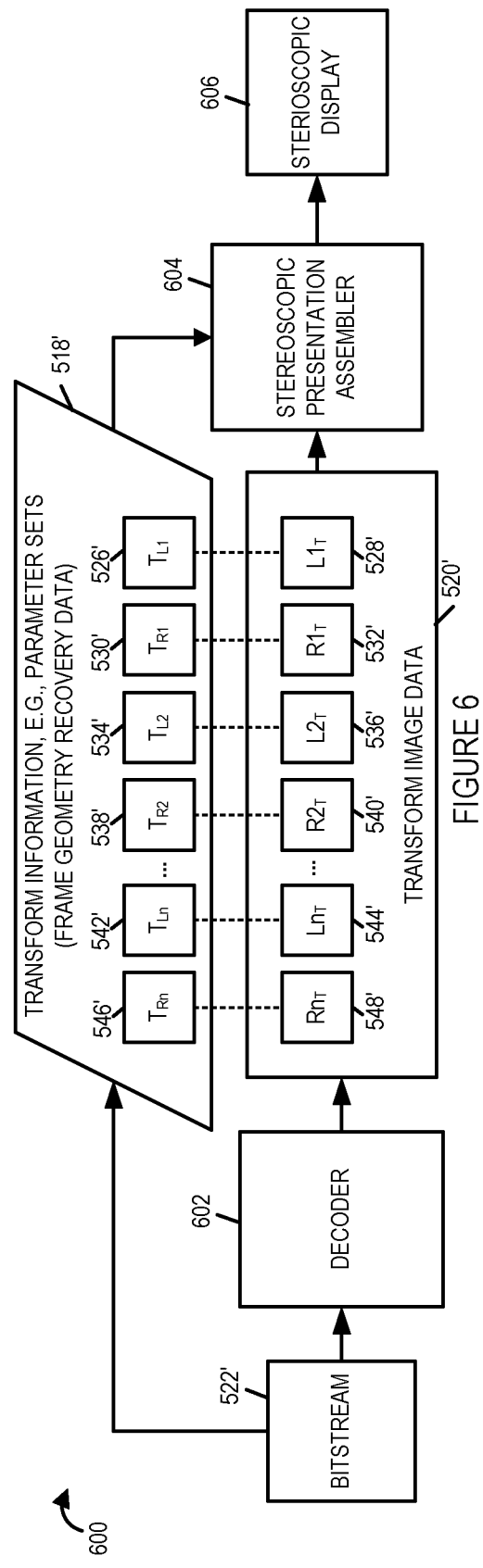

3D VIDEO ENCODING AND DECODING METHODS AND APPARATUS

RELATED APPLICATIONS

The present application is a continuation of U.S. patent application Ser. No. 13/533,465 filed on Jun. 26, 2012 which claims the benefit of the filing date of U.S. Provisional Patent Application Ser. No. 61/652,111 filed May 25, 2012, and which is a continuation-in-part of U.S. patent application Ser. No. 13/443,864 filed on Apr. 10, 2012, titled "3D VIDEO ENCODING AND DECODING METHODS AND APPARATUS", which claims the benefit of the filing date of U.S. Provisional Patent Application Ser. No. 61/473,809 filed Apr. 10, 2011 titled "3D VIDEO ENCODING AND DECODING METHODS AND APPARATUS", each of the preceding applications are hereby expressly incorporated by reference in their entirety.

FIELD

The present application is related to stereoscopic video encoding and decoding and, more particularly, to methods and/or apparatus for supporting encoding and decoding of stereoscopic video using left and right eye image encoding and decoding techniques, e.g., difference based encoding and decoding techniques.

BACKGROUND

Left and right eye images of a frame pair in stereoscopic video often include minor differences resulting from the different spatial locations of the cameras used to capture the left and right eye images of a frame pair.

Difference encoders, e.g., motion based or other inter-frame encoders, offer an attractive method of encoding left and right eye images. Unfortunately, while the left and right eye images are often very similar, the relatively minor differences between the images can result a fair amount of encoding artifacts and/or less then desirable data compression when difference based encoding methods are used to encode a sequence of frames including left and right eye images of a stereoscopic image sequence, e.g., movie, program or other piece of video or 3D image content.

In view of the above discussion, it should be appreciated that there is a need for improved methods of generating encoded stereoscopic image data and for decoding such data. While it is desirable that difference encoding and decoding techniques be used, it would be desirable if pre and/or post encoding or decoding techniques could be developed to improve the quality and/or data efficiency achieved by the overall encoding and/or decoding process.

SUMMARY

Methods and apparatus for stereoscopic video encoding and decoding are described. In various embodiments, images, e.g., frames corresponding to left and right eye images are encoded after the left and right eye images are arranged so that they are interleaved as they are supplied to an encoder. The encoder efficiently encodes the left and right eye images using difference encoding techniques, e.g., motion vectors with one eye image being used as reference data for the other.

While the interleaving of left and right eye images results in rather efficient encoding due to the fact that left and right eye images are often very similar in content but often shifted slightly, various features of the present invention allow for more efficient encoding than that which can be achieved by simply interleaving left and right eye images. In many cases the methods and apparatus involve various pre-encoding and/or post decoding processing steps.

At least some embodiments relating to improving the efficiency of encoding performed by an encoder which processes left and right eye images, e.g., in an interleaved manner, and which performs at least some difference based encoding, e.g., motion compensated prediction or other encoding where the coding of one frame may depend on the image data of a preceding frame.

In at least one embodiment processing of stereoscopic image data including a left eye image and a right eye image of a frame pair, includes scaling said left eye image and said right eye image by a first amount, performing a left eye transform operation on said scaled left eye image to generate a transformed left eye image, performing a right eye transform operation on said right eye image to generate a transformed right eye image, and cropping said transformed left eye image and said transformed right eye image to generate a cropped transformed left eye image and a cropped transformed right eye image. The method may further include encoding the cropped transformed left and right eye images using an encoder which performs difference encoding on at least one of said cropped transformed left and right eye images using the other one of said transformed cropped left and right eye images as a reference image, said encoding producing an encoded left eye image and an encoded right eye image. In some but not necessarily all embodiments the difference encoding includes motion compensated prediction encoding.

While the amount of scaling may be set for a scene or program including multiple frames, the process performed on the images of an individual frame pair often includes determining a first transform to be used as said left eye transform operation and a second transform to be used as said right eye transform operation for the left and right eye images of a frame pair. The determination of the left and right eye image transforms to be used may, and in some embodiments does, include comparing content of said left eye image and said right eye image to determine image transform operations which will reduce the difference between an area of said scaled transformed left eye image and said scaled transformed right eye image. Transforms which may be determined include a null transform, a shifting transform, an anamorphic scaling transform, a keystone transform and/or a warping transform. When the null transform is applied no change is made to the processed images. In the case of the other transforms which result in image changes, the transform applied to the left and right images are normally equal and opposite to each other to reduce the amount of overall change, e.g., shift, to either image while still making a transform intended to reduce the difference between the cropped transformed left and right eye images which are supplied to the encoder for encoding.

Information about the transform applied to the left and right eye images along with the amount of scaling and/or transform information applied to generate the encoded left and right eye images is stored and/or communicated to a playback device with the generated left and right eye images.

A decoder decodes received encoded left and right eye images. The decoded left and right eye images are processed based on the scaling and/or transform information communicated with the encoded left and right eye images. The decoded left and right eye images are scaled. In some embodiments, the scaling factor used following decoding is a reciprocal of the scaling factor used prior to encoding. If transforms were applied prior to encoding, following decoding the decoded left and right eye images are subjected to inverse transforms prior to filling operations. The inverse transforms may be based on information included in the bitstream with the encoded images. The information may specify the inverse transform operation to be performed, e.g., by indicating what the original transform was or by indicating a particular operation to be used as the inverse transform. As a result of the cropping operation the final image output will be, at least in some embodiments, the same size as the encoded left and right images.

In some embodiments data lost in one of the left and right images as a result of the shifting and cropping may be, and in some embodiments is, replaced with data from the other one of the left and right eye images corresponding to the same image location as the location where the image data was lost. While the scaling, transform, e.g., shifting, and cropping operations performed prior to encoding and subsequent to decoding may result in the loss of some image data, the decrease in differences between left and right eye images supplied to the decoder can result in more efficient and/or accurate coding of the images portions which remain. Thus the overall effect of the pre-coding and post-coding processing when combined with use of a difference encoder can result, in many cases, in improved perceived image quality for a given data rate or total amount of data than could be achieved without the use of the pre-coding and post-coding processing used in various embodiments.

An exemplary method of processing stereoscopic image data including a left eye image and a right eye image of a frame pair, in accordance with some embodiments, comprises: scaling said left eye image and said right eye image by a first amount to generate a scaled left eye image and a scaled right eye image; performing a left eye transform on said scaled left eye image, said left eye transform including at least a cropping operation and generating a cropped left eye image; and performing a right eye transform on said scaled right eye image, said right eye transform including at least a cropping operation and generating a cropped right eye image. An apparatus, e.g., an image processing device, configured to process stereoscopic image data including a left eye image and a right eye image of a frame pair, in accordance with some embodiments comprises: a first scaling module configured to scale said left eye image and said right eye image by a first amount to generate a scaled left eye image and a scaled right eye image; a first transform module configured to perform a left eye transform on said scaled left eye image, said left eye transform including at least a cropping operation and generating a cropped left eye image; and a second transform module configured to perform a right eye transform on said scaled right eye image, said right eye transform including at least a cropping operation and generating a cropped right eye image.

An exemplary method of processing encoded stereoscopic image data including an encoded left eye image of a frame pair, in accordance with some embodiments, comprises: decoding said encoded left eye image to produce a decoded left eye image; scaling said decoded left eye images to generate a scaled decoded left eye image; and performing an inverse left eye transform on said scaled decoded left eye image to generate a left eye output image, wherein performing an inverse left eye transform includes performing a first fill operation. An exemplary apparatus configured to process encoded stereoscopic image data including an encoded left eye image of a frame pair, in accordance with some embodiments, comprises: a first decoder module decode configured to decoded said encoded left eye image to produce a decoded left eye image;

a first scaling module configured to scale said decoded left eye images to generate a scaled decoded left eye image; and a first inverse transform module configured to perform an inverse left eye transform on said scaled decoded left eye image to generate a left eye output image, wherein said first inverse transform module includes a first fill module configured to perform a first fill operation.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 1 is a drawing of an exemplary received sequence of left and right eye image pairs for a sequence of frames in accordance with an exemplary embodiment.

FIG. 2 illustrates exemplary identified scenes in a sequence of left and right frame image pairs, e.g., exemplary groupings of frames into scenes, in accordance with an exemplary embodiment.

FIG. 5 is a drawing illustrating exemplary processing of input left/right image streams for a sequence of frames to generate a bitstream in accordance with an exemplary embodiment.

FIG. 6 is a drawing illustrating exemplary processing of a bit stream to generate stereoscopic display output in accordance with an exemplary embodiment.

DETAILED DESCRIPTION

Figure 3:
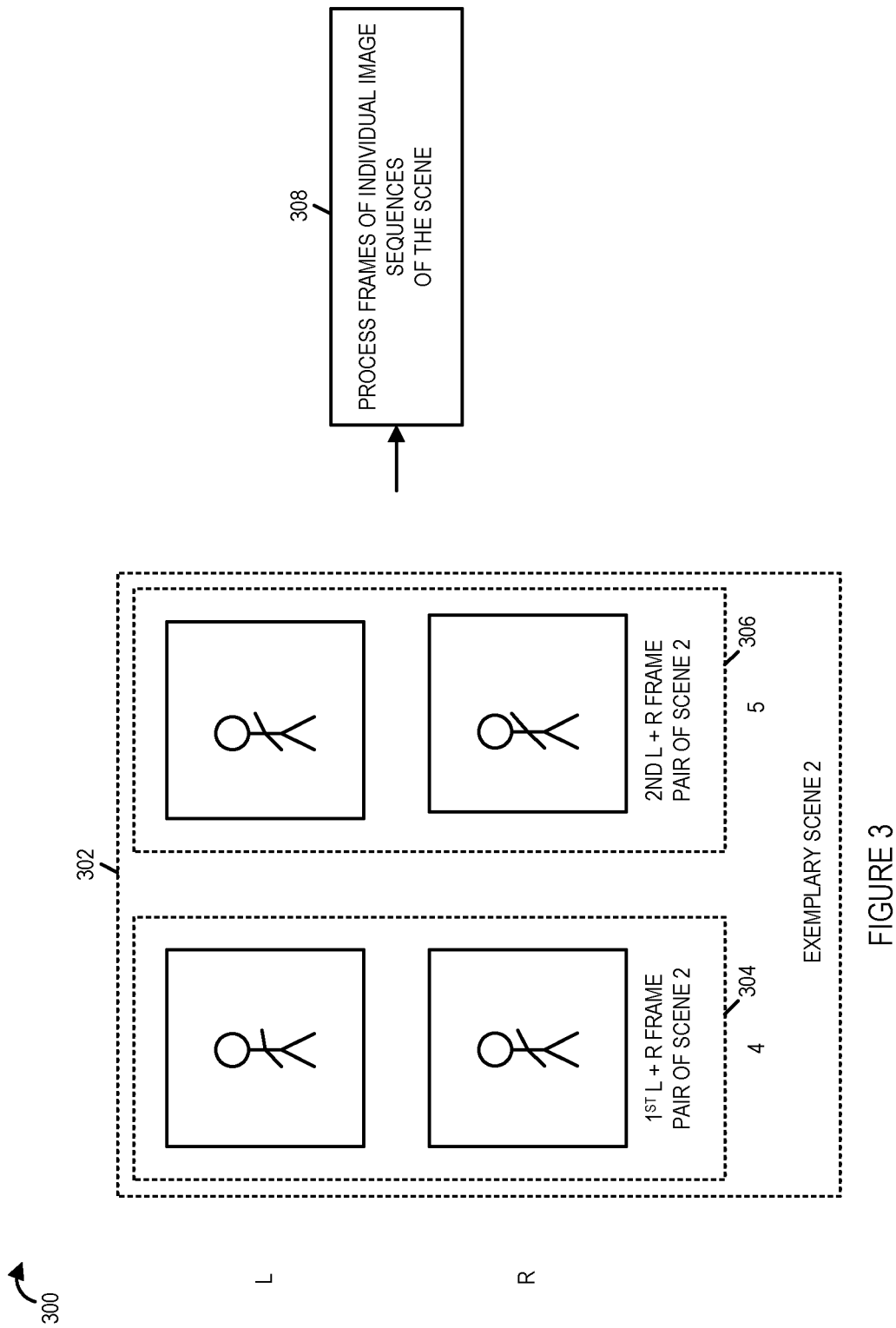
FIG. 3 illustrates exemplary images in an exemplary scene, in which image pairs of the frame are processed, e.g., transformed in accordance with a selected transform method for the scene, in accordance with an exemplary embodiment.

In accordance with one embodiment of the present invention a sequence of frames, e.g., left and right eye image frame pairs, is received. Drawing 100 of FIG. 1 illustrates exemplary reception of an input sequence of left and right eye image frame pairs. Corresponding to frames (1, 2, 3, 4, 5, N), input image pairs (($I_{L1}$ 102, $I_{R1}$ 104), ($I_{L2}$ 106, $I_{R2}$ 108), ($I_{L3}$ 110, $I_{R3}$ 112), ($I_{L4}$ 114, $I_{R4}$ 116), ($I_{L5}$ 118, $I_{R5}$ 120), . . . , ($I_{LN}$ 122, $I_{RN}$ 124)), respectively, are received as indicated by box 126.

Drawing 200 of FIG. 2 illustrates that the input frames are analyzed to group the frames into sets where each set corresponds to a scene. In this example, the input image is analyzed to identify scenes based on the amount of change between consecutive frames, as indicated by box 202. In this example, there is an identified scene 1 204 corresponding to the L+R frame pairs for frames 1, 2 and 3, and there is an identified scene 2 206 corresponding to the L+R frame pairs for frames 4 and 5. In some embodiments, an input group corresponding to multiple L+R frame pairs is initially analyzed to identify scenes, and then at a later point in time the frame pairs of each of the identified scenes are subsequently processed, e.g., on a per scene basis. In some other embodiments, determination of scene boundary points is determined on an ongoing basis along with the processing. For example, after reception of a L+R input image pair, the received image pair is classified as the first image pair of a new scene or an image pair of an ongoing scene, and then the image pair is processed, e.g., transformed.

Scenes may, and in some embodiments are, distinguished based on the amount of difference from one image to the next. In accordance with one embodiment, scene analysis and grouping of frames to scenes is based on a single one of the left and right eye image sequences. For example, the left eye images may be analyzed and a significant change, e.g., a difference in luminance values above a predetermined threshold from one scene to the next, may be used to distinguish between frames corresponding to different scenes. Techniques used to divide frames into groups of pictures for image encoding may be used to separate the input frames into different scenes. Once a scene break point is determined, the left and right eye frames determined to correspond to a scene are treated as a group of frames for subsequent image processing and encoding purposes.

While differences between the frames corresponding to a single eye can be used to determine scene break points, in accordance with one embodiment of the present invention differences between left and right eye frames of individual frame pairs is also considered. A large difference between a left eye image and right eye image of a frame pair may be used to determine a scene break point for encoding purposes. In some embodiments this scene determination consideration is combined with the difference between consecutive images (frames) when deciding how to group frame pairs to scenes for purpose of frame groupings that are then subject to further processing.

Drawing 300 of FIG. 3 illustrates exemplary scene 2 302, which comprises $1^{st}$ L+R image pair 304 for frame 4 and $2^{nd}$ L+R image pair 306 for frame 5. Notice that there are slight differences between the left and right image corresponding to a particular frame, and that there are also slight difference between the images of frame 4 and 5 corresponding to same side. The frame pairs of individual image sequences of the scene are processed, as indicated by block 308. In some embodiments, processing the first frame of a scene is performed differently than processing subsequent frames of the scene. For example, in one exemplary embodiment, if the image pair is the first frame of a scene, then an operation is performed to determine which transform method should be used for the scene, and then the determined transform method is applied to the image data of the frame. Continuing with the example, if the image pair is a subsequent frame of a scene, then a transform parameter adjustment is performed to the determined transform method and then the image data of the frame is processed.

In some embodiments, the frame pairs of each scene are processed in accordance with one feature of the invention to minimize differences between frames corresponding to a frame pair and to make sure that scaling differences from one frame pair to the next in a scene are not too large, e.g., above a threshold, which might result in noticeable size differences of an object from one frame to the next. Scene level processing of one exemplary embodiment is described below.

Scene level processing involves analyzing each left and right frame pair to determine the maximum image shift required in each of the vertical & horizontal directions to minimize the difference in the left and right frames if the shifted images are compared. The shifting process assumes that each of the left and right eye images can be shifted by half of the maximum permitted shift. In some embodiments the amount of image shift which is permitted is up to 5%.

After the optimal image shift to reduce the difference between the images when they are overlaid for each of the image pairs of the scene is determined, subject to the constraint of a maximum permitted shift the largest of the shifts is determined. Next a maximum scaling amount is determined for the scene. The maximum scaling amount is the amount of scaling required to fully occupy a frame of the original display size if an image shifted by the maximum determined scene shift was scaled to the original display size and fully occupied the display window.

The left and right eye frames of each frame in the sequence are then scaled by an amount less than or equal to the maximum scaling amount. The amount applied to a particular pair of frames is determined by the amount of shift required to minimize the difference between the frames taking into consideration that the amount of scaling should not differ from that applied to a preceding frame pair of the same scene by a visibly noticeable amount, e.g., by more than a few percent, in some cases no more than 2 or 3 percent.

After scaling of the first pair of images in an image sequence to minimize the difference between the overlapping portions of the shifted frames, the scaled images are cropped to the original intended display size. The scaled and cropped frame pair is then provided to an encoder which efficiently encodes the scaled and cropped images, e.g., as if no image shifting or scaling had occurred. Metadata indicating the amount of horizontal and vertical shifting applied to the left and right eye images along with scaling information is encoded as metadata or auxiliary data and communicated in the encoded data along with the image data representing the left and right eye image pair.

The shifting, scaling, cropping steps are repeated for each left and right frame pair corresponding to a scene with change in scaling from one image to the next being constrained to limit the amount of change in the size of an object from one frame pair to the next. The encoder may, and in some embodiments does, treat the frames of a scene as a GOP (Group of Pictures) for encoding purposes with the left and right frames of an image sequence being supplied to the encoder in an alternating manner. As a result of the shifting, scaling and cropping operations, images are encoded in an efficient manner with very little or no difference between many of the left and right eye images allowing for the encoder to simply indicate that the second frame in a left and right eye image pair is the same as the previous frame in many cases.

A decoder implemented in accordance with the invention receives stereoscopic image data, e.g., a sequence of encoded frame pairs along with the encoded data indicating the shifting and/or scaling that was applied prior to encoding, e.g., using motion compensated prediction and/or entropy encoding techniques. The decoder decodes the encoded image corresponding to a frame pair and then scales the decoded image data of the frame pair by the amount of scaling indicated by the information associated with the frame pair being decoded. The decoder then reverses the indicated image shift moving the scaled images back into their correct positions for purposes of final display. The decoded scaled and shifted images are then cropped leaving rectangular images of the intended display size for display.

The decoded, scaled, shifted and cropped left and right eye images are then sent to a rendering unit for display.

Given that scaling and cropping occurs in both the encoder and decoder, the maximum amount of image loss due to scaling and cropping is normally twice the amount applied in either the encoder or decoder alone.

While the scaling and cropping of the present invention can result in some loss of edge portions of an image, the savings in terms of encoded data rate made possible by the combination of shifting, scaling and cropping in the context of coding and decoding frames of left and right eye image pairs can be considerable.

Figure 4:
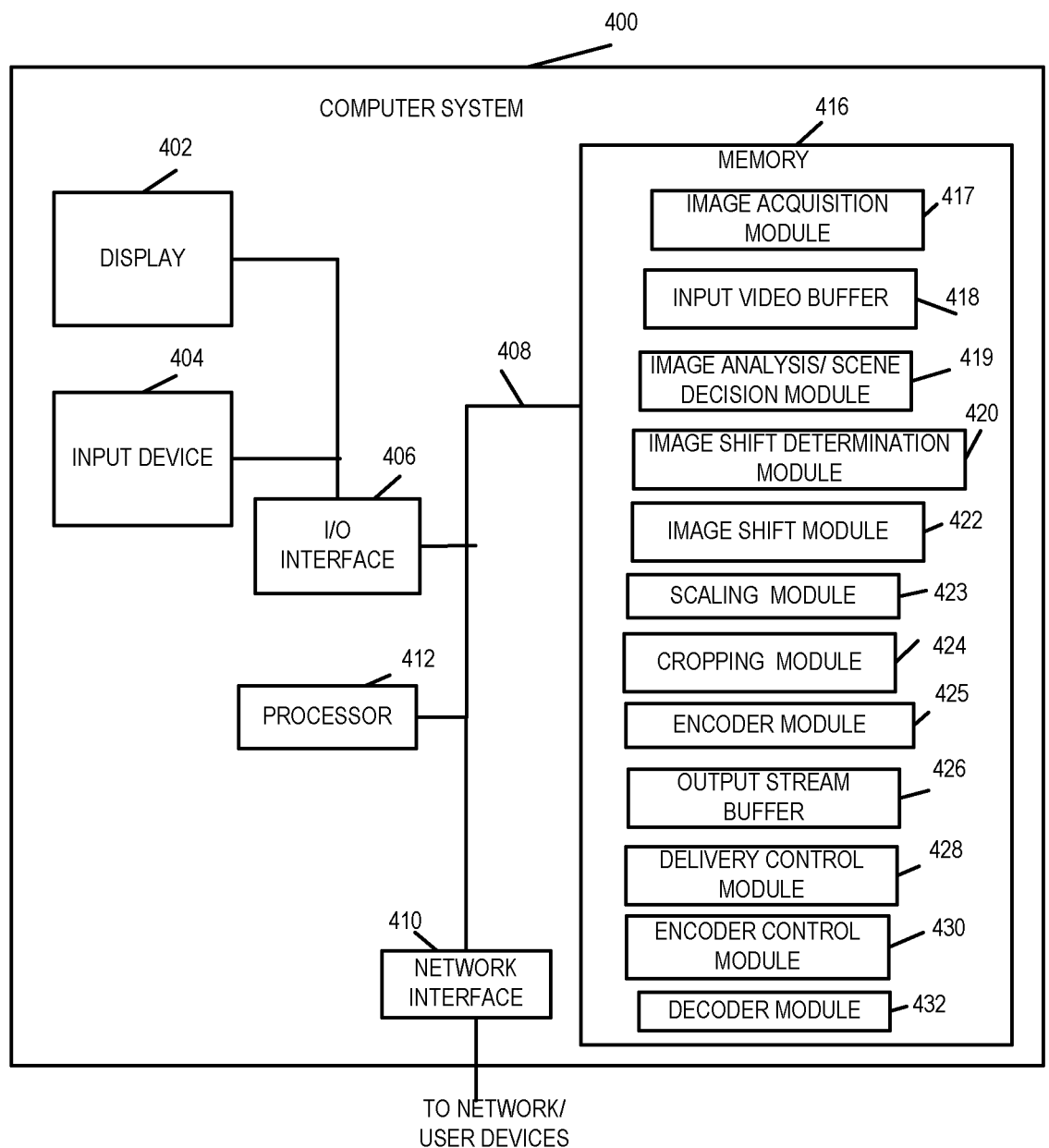
FIG. 4 illustrates a computer based encoding and decoding system implemented in accordance with the present invention.

The method and apparatus of the present invention can be implemented using a processor and memory as shown in FIG. 4.

FIG. 4 illustrates a computer based encoding and decoding system 400 implemented in accordance with the present invention. The system 400 includes a display 402, input device 404, input/output (I/O) interface 406, a processor 412, network interface 410 and a memory 416 which are coupled together by bus 408. The memory 416 includes various modules, e.g., routines, which when executed by the processor 412 control the computer system 400 to implement the encoding and/or decoding methods which have been described.

The memory 416 includes an image acquisition module 417 for receiving and storing video content to be encoded. The video content, e.g., left and right eye frame pairs of a stereoscopic e.g., 3D, image sequence, are stored in input video buffer 418. Image analysis/decision module 419 analyses the buffered video content and makes decisions, e.g., frame to scene groupings, and provides information to the encoder and/or compression module 425. The analysis includes scene detection and grouping of frame pairs to scenes for purposes of subsequent image processing. For encoding purposes, the frames designated as corresponding to a scene are treated as a group of pictures with the first frame of the group being encoded using Intraframe coding.

The image shift determination module 420 determines the maximum shift required for the frames in a scene as well as the individual shifts to be applied to frames in frame pairs corresponding to a scene. Image shift module 422 is responsible for applying the determined shifts to individual frames, and scaling module 423 is responsible for implementing scaling operations. Cropping module 424 is used for performing cropping operations. Image shift, scaling and cropping modules are used for both encoding and decoding. Encoder module 425 encodes frames with left and right frames which have been subject to scaling, shifting and cropping being encoded with the left and right frames being presented in an interleaved manner to the encoder 425. Decoder module 432 decodes images which are then subject to shifting, scaling and cropping prior to output for display on the display 402. Delivery control module 428 supports streaming of content stored in output stream buffer 426. Content which is streamed may be produced by encoder module 425 as discussed above.

The encoder control module 430 is responsible for controlling the supply of content to be encoded from the input video buffer 418 to the encoder module 425 along with the corresponding encoder control information form image analysis/decision module 419.

The decoder module 432 can be used to decode an encoded stream and to supply it to the display 402. In this manner an operator of computer system 400 can view the result of the encoding process. The operator may control one or more encoding parameters via input device 404 and/or select which of the encoded bitstreams is to be decoded and displayed via input device 404. The various components of the computer system 400 are coupled together via bus 408 which allows for data to be communicated between the components of the system 400.

FIG. 5 is a drawing 500 illustrating exemplary processing of input left/right image streams for a sequence of frames to generate a bitstream in accordance with an exemplary embodiment. Drawing 500 includes a precoder-interleave module 502 for processing input image pairs, corresponding to input frames, and an encoder module 504 for encoding transformed image data. Precoder-interleave module 503 receives input images from a left stream and from a right stream in pairs, each pair corresponding to a frame, and generates transform information 518, e.g., parameter sets, and corresponding transform image data 520. The transform information is sometimes referred to as frame geometry recovery data. Precoder-interleave module 502 receives frame 1 left stream image L1 506 and frame 1 right stream image R1 508 as inputs and generates transform parameter set $T_{L1}$ 526, transform image data $L1_T$ 528, transform parameter set $T_{R1}$ 530 and transform image data $R1_T$ 532, as outputs. Precoder-interleave module 502 receives frame 2 left stream image L2 510 and frame 2 right stream image R2 512 as inputs and generates transform parameter set $T_{L2}$ 534, transform image data $L2_T$ 536, transform parameter set $T_{R2}$ 538 and transform image data $R2_T$ 540, as outputs. This process continues for each of the left/right image pairs of the frames being processed. Precoder-interleave module 502 receives frame n left stream image Ln 514 and frame n right stream image Rn 516 as inputs and generates transform parameter set $T_{Ln}$ 542, transform image data $Ln_T$ 544, transform parameter set $T_{Rn}$ 546 and transform image data $Rn_T$ 548, as outputs. The transform image data 520, which is interleaved left/right transformed image data, is input to the encoder 504, where it is encoded. Then, the encoded transformed image data is combined with the transform information 518 to generate a bitstream 522.

The precoder 502 also includes the capability to operate in a calibration mode. Based on specific configurations, e.g., lighting conditions, cameras, lenses, etc., transform methods for specific scenes are predetermined. The system is put into calibration mode and the precoder 502 goes through each of its transformation methods, and then the precoder 502 records quality data both internally and from the encoder. Quality measurements 524 indicates exemplary data from the encoder when in the calibration mode. Then the precoder 502 records the best transformation method into a preset for that particular scene setup and saves it, e.g., to disk. The quality data could be an encoding quality metric, QP, received back from the encoder, PSNR, SSIM, and/or any other quality metric. Then, when running in normal mode, the precoder 502, as part of or prior to the transform method discovery, would first try to match the scene meta data, as signaled through external means, with a preset. If it knows which preset, it would simply use that. If it does not recognize the scene data, then it would proceed trying to find the best transform method.

FIG. 6 is a drawing 600 illustrating exemplary processing of a bit stream to generate stereoscopic display output in accordance with an exemplary embodiment. Drawing 600 includes a decoder 602, a stereoscopic presentation assembler 604 and a stereoscopic display 606. A portion of bitstream 522' is input to decoder 602 which recovers transform image data 520', and the recovered transform image data 520' is forwarded to the stereoscopic presentation assembler 604. A portion of the bitstream 522' includes transform information, e.g., parameter sets, sometimes referred to as frame geometry recovery data, which is also input to the stereoscopic presentation assembler. Stereoscopic presentation assembler 604 uses transform image data $L1_T$ 528' transform information parameter set $T_{L1}$ 526', transform image data $R1_T$ 532' and transform information parameter set $T_{R1}$ 530' to recover a stereo pair of images for frame 1, which is a representation of image pair (L1 506, R1 508). Stereoscopic presentation assembler 604 uses transform image data $L2_T$ 536' transform information parameter set $T_{L2}$ 534', transform image data $R2_T$ 540' and transform information parameter set $T_{R2}$ 538' to recover a stereo pair of images for frame 2, which is a representation of image pair (L2 510, R2 512). Stereoscopic presentation assembler 604 performs a similar operation to recover a stereo pair for each frame communicated in the bitstream 522'. Stereoscopic presentation assembler 604 uses transform image data $Ln_T$ 544' transform information parameter set $T_{Ln}$ 542', transform image data $Rn_T$ 548' and transform information parameter set $T_{Rn}$ 546' to recover a stereo pair of images for frame n, which is a representation of image pair (Ln 514, Rn 516).

Note that the input bitstream of FIG. 6 is represented as 522', while the output bitstream of FIG. 5 is represented as 522. In an example, where there is no corruption of the bitstream over the channel, the input bitstream of FIG. 6 is 522. Transform image data and transform information in FIG. 6 is similarly represented with reference numbering using ' in comparison to the reference numbering used for the transform image data and transform information generated in FIG. 5 to indicate that the information in FIG. 6 may include some corruption.

The output of the stereoscopic presentation assembler 604 is input to the stereoscopic display 606 which displays the images.

Figure 7:
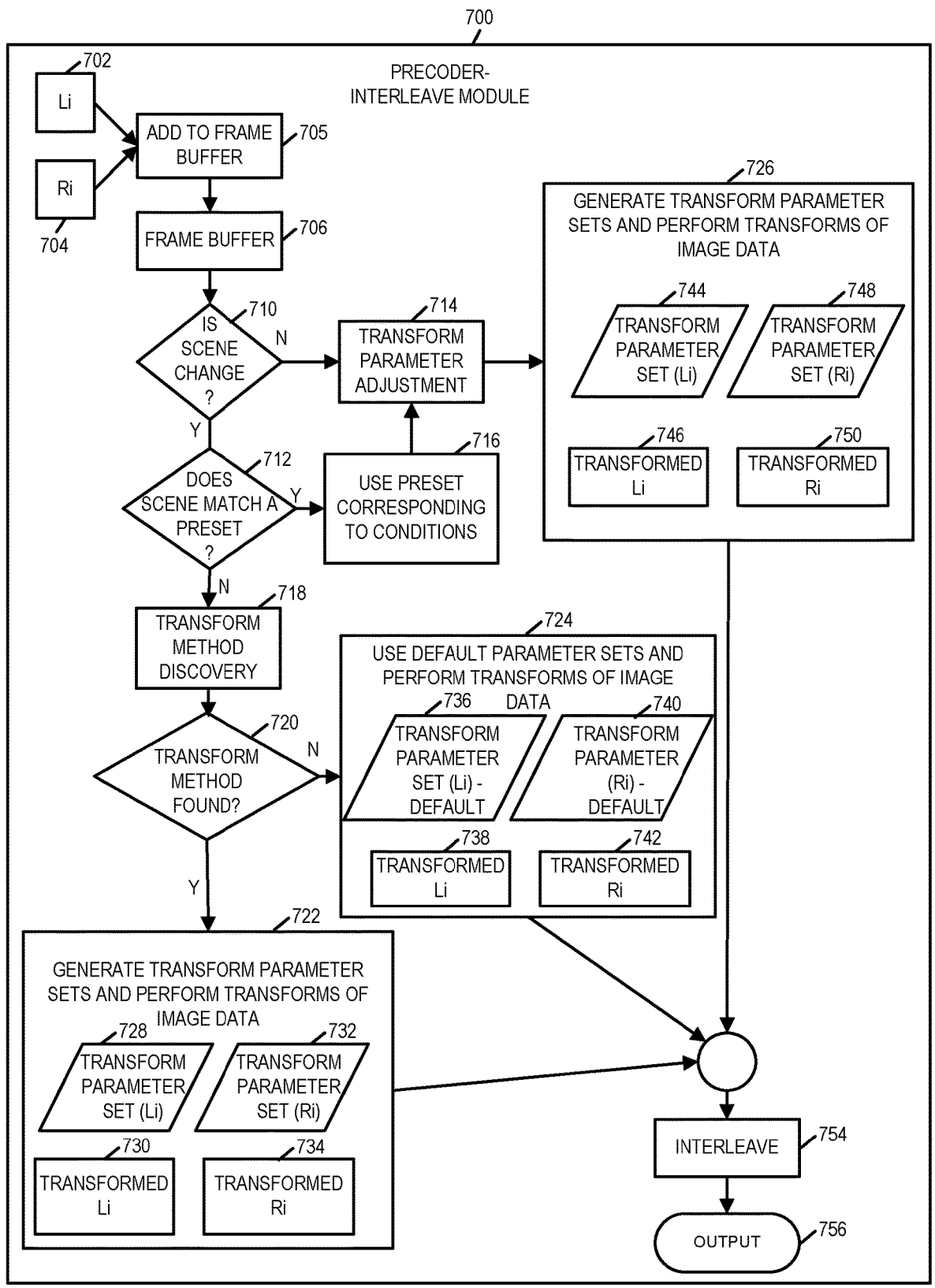
FIG. 7 illustrates an exemplary precoder-interleave module in accordance with an exemplary embodiment.

FIG. 7 illustrates an exemplary precoder-interleave module 700 in accordance with an exemplary embodiment. Exemplary precoder-interleave module 700 is, e.g., pre-code interleave module 502 of FIG. 5. Left stream image data corresponding to exemplary frame i, Li 702, and right stream image data corresponding to frame i, Ri 704 is added to frame buffer 706 by module 705. Exemplary frame i is, e.g., any one of the n frames of FIG. 5. Then, module 710 checks if there is a scene change or if this is the first frame being processed. If module 710 determines that there is a scene change or if this is the first frame being processed, then module 712 determines if the scene matches a preset. However, if module 710 determines that there is not a scene change, then module 714 performs a transform parameter adjustment.

If module 712 determines that the scene does not match a preset, then module 718 performs transform method discovery. Module 720 controls operation as a function of whether or not the transform method discovery module 718 has found a transform method. If the transform method discovery has found a transform method to use, then module 722 uses the found transform method to generate transform parameter sets and perform transforms of the image data (Li, Ri) to generate: transform parameter set for Li 728, transform parameter set for Ri 732, transformed image data Li 730, and transformed image data Ri 734.

If the transform method discovery has not found a transform method to use, then module 724 uses default parameter sets (default parameter set for Li 736, default parameter set for Ri 740) to perform transforms of the image data (Li, Ri) to generate transformed image data Li 738, and transformed image data Ri 742. In some embodiments, transformed image data Li 738 is a cropped representation of image data Li 702 and does not include any scaling transform or shift transform. In some embodiments, transformed image data Ri 742 is a cropped representation of image data Ri 704 and does not include any scaling transform or shift transform.

Returning to module 712, if module 712 determines that the scene does match a preset, e.g., one of a plurality of alternative presets determined during a calibration mode of operation, then module 716 uses the preset corresponding to the conditions. Next module 714 performs a transform parameter adjust from the preset. Then, module 726 uses the transform parameter adjustments to generate transform parameter sets and perform transforms of the image data (Li, Ri) to generate: transform parameter set for Li 744, transform parameter set for Ri 748, transformed image data Li 746, and transformed image data Ri 750. The transformed parameter sets and corresponding transformed image data, (728, 732, 730, 734) or (736, 740, 738, 742) or (744, 748, 746, 750) is forwarded to the interleave module 754 which performs interleaving of left and right information and outputs the information. In various embodiments, the transform parameters sets are interleaved in a first output stream and the transform image data is interleaved in a second output stream. In some embodiments, the interleaved transform image data is sent to an encoder while the interleaved transform parameter sets bypasses the encoder.

In one exemplary embodiment, transform method discovery module 720 is implemented in accordance with the pseudo-code shown below.

Transform Method Discovery

```
function transform method discovery
  input left frame, right frame
{
  for each frame in stereo pair
    discover features
  for each left frame feature
    find matching right frame feature
    if match found
      add to feature map
  for each mapped feature
    calculate and store positional and size differences
  if positional differences near 0 and size differences near zero
    return default transform set
  if size differences are uniform
    determine scale factor based on size differences
    apply half of the scale factor to left and half to right frame
    add scaling factor to transform set
    recalculate features based on new scaling
  if positional differences are uniform
    determine shift amount
    apply half of shift to left frame and half to right frame to transform
    set
    recalculate features based on shift
  if size differences are not uniform and positional differences are not
  uniform
    perform exhaustive geometric modification
    if modification found
      apply geometric modification
      add advanced geometric modification to transform set
  return transform set and modified frame for left and right frames
}
```

In one exemplary embodiment, transform parameter adjustment module 714 is implemented in accordance with the pseudo-code shown below.

Transform Parameter Adjustment

```
function transform parameter adjustment
  input left frame, right frame, previous left transform, previous right
  transform
{
  for each input frame
    discover features
  for each input frame
    determine adjustment based on given previous transform
    apply adjustment
    set transform for frame
  return transform set
}
```

Figure 8:
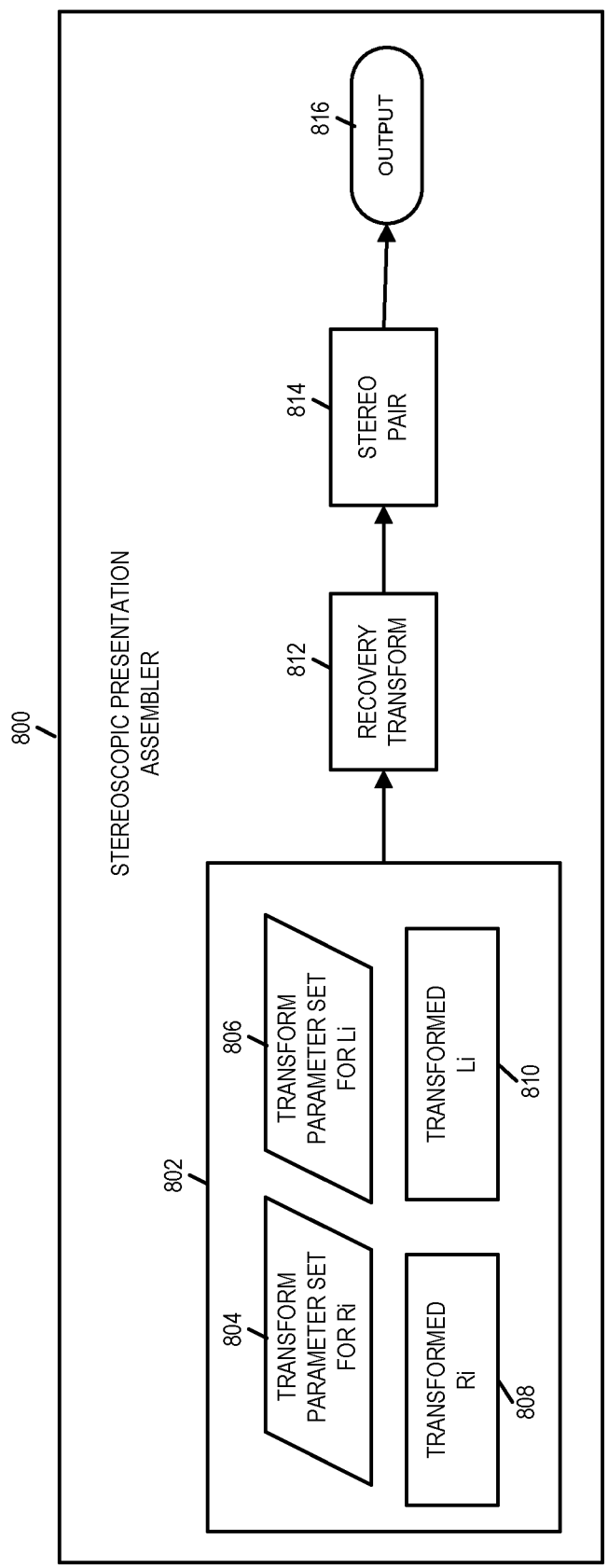
FIG. 8 is a drawing of an exemplary stereoscopic presentation assembler in accordance with an exemplary embodiment.

FIG. 8 is a drawing of an exemplary stereoscopic presentation assembler 800 in accordance with an exemplary embodiment. Exemplary stereoscopic presentation assembler 800 is, e.g., stereoscopic presentation assembler 604 of FIG. 6. Assembler 800 receives information 802 for each frame which is input to recovery transform module 812. Information 802 includes transform information for exemplary frame i (transform parameter set for Ri 804, transform parameter set for Li 806) and transformed image data for exemplary frame i (transformed Ri 808, transformed Li 810). The recovery transform module 812 generates stereo image pair 814. Output module 816 outputs the generated stereo pair 814, e.g., to a stereoscopic display.

In one exemplary embodiment, recovery transform module 812 is implemented in accordance with the pseudo-code shown below.

Recovery Transform

```
function recovery transform
  input left frame, right frame, left transform set, right transform set
{
  for each input frame
    for each transform
      perform inverse transformation replacing missing portions of the
      frame as needed
  return modified left frame and modified right frame
}
```

Figure 9:
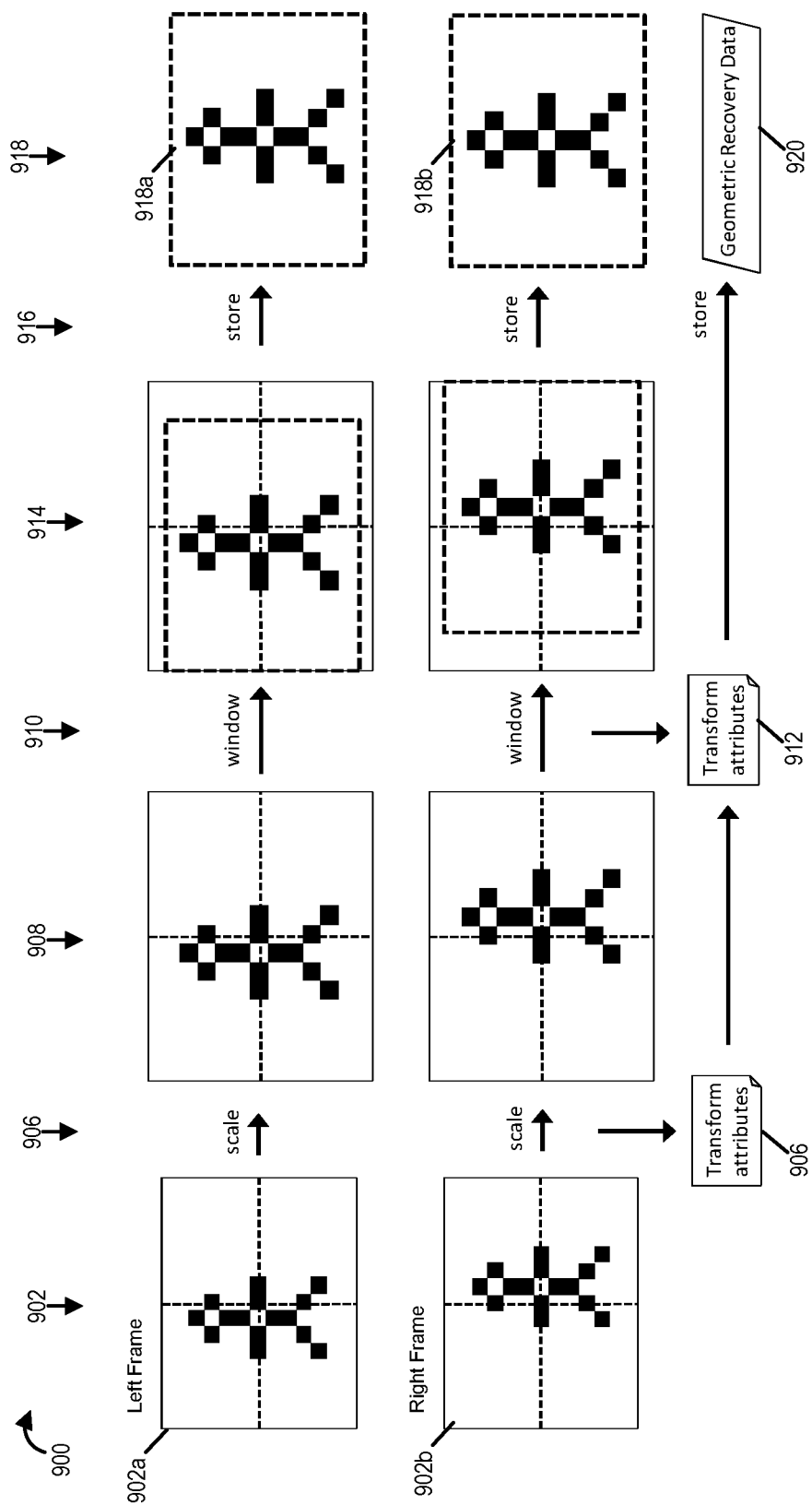
FIG. 9 illustrates exemplary operations for processing a left and right input image pair corresponding to a frame to generate transform information and corresponding transformed images in accordance with an exemplary embodiment.

Drawing 900 of FIG. 9 illustrates exemplary operations for processing a left and right input image pair corresponding to a frame to generate transform information and corresponding transformed images in accordance with an exemplary embodiment. Column 902 illustrates an exemplary left input image 902a and an exemplary right input image 902b of an exemplary input image pair for a frame. Column 906 illustrates that scaling operations are performed and transform attributes corresponding to the scaling are stored as information 906. Column 908 illustrates the output of the scaling. Column 910 indicates that windowing is performed on the scaled images and transform attributes corresponding to the windowing are stored as information 912. Column 914 illustrates the results of the windowing operation. Column 916 indicates that the scaled windowed images and the transform attributes are stored. Column 918 illustrates the transformed images (left transformed image 918a, right transformed image 918b) and corresponding geometric recovery data 920 which are stored.

Figure 10:
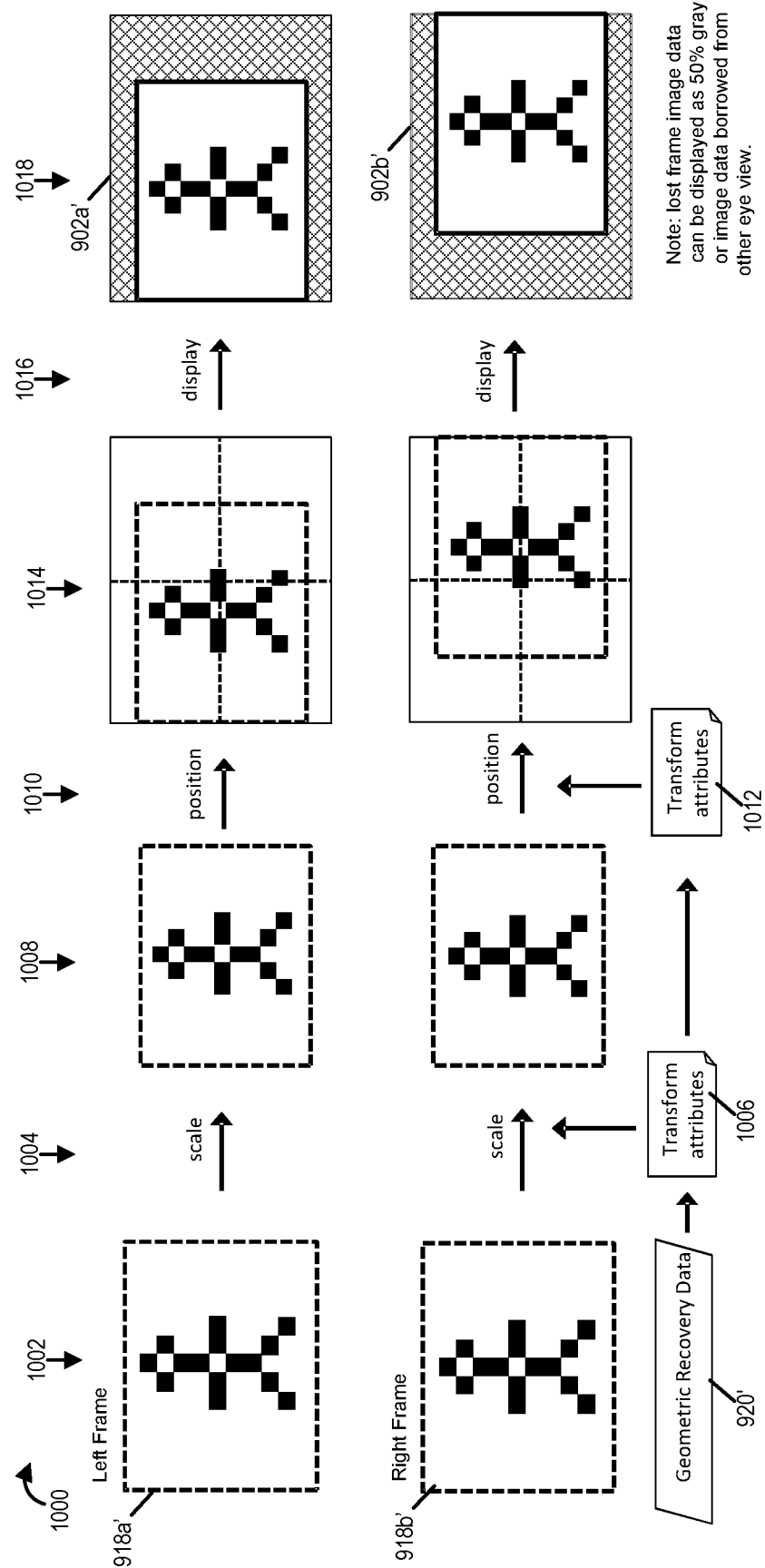
FIG. 10 illustrates exemplary operations for performing recovery transform operations in accordance with an exemplary embodiment.

Drawing 1000 of FIG. 10 illustrates exemplary operations for performing recovery transform operations in accordance with an exemplary embodiment. Column 1002 illustrates an exemplary left transform image 918a' and an exemplary right transform image 918b' corresponding to an input image pair for a frame, and corresponding geometric recovery data 920'. Column 1004 indicates that transform attributes 1006 regarding scaling are recovered from the geometric recovery data 920' and used to rescale the images (918a', 918b'). The results of the rescaling are shown in column 1008. Column 1010 indicates that transform attributes 1012 regarding positioning are recovered from the geometric recovery data 920' and used to position the rescaled images. The results of the positioning are shown in column 1014. Column 1016 indicates that the positioned rescaled images are displayed. Column 1018 illustrates exemplary display images (left display image 902a', right display image 902b'). In some embodiments, some or all of the lost frame image data is displayed as 50% gray. In some embodiments, some of all of the lost frame image data is borrowed from the other eye view.

In some embodiments the amount of image scaling is kept to 10% or less of the original image size. Image size may be expressed in terms of a number of horizontal and vertical pixels. In some embodiments scaling is kept to 5% or less of original image size. In at least some embodiments the scaling is kept to between 2% and 5% of the original unencrypted image size. Cropped images may, and in some embodiments are, kept to the size of the original input image or within 20 pixels in each of the vertical and horizontal directions of the original image size. In some embodiments the cropped picture is slightly small than the original image and does not include border pixels, e.g., an 8 pixel original image border, which are normally not displayed. In some such embodiments the cropped image size is kept smaller than the original image size to minimize the loss of portions of the image which are likely to be displayed and to use the limited bandwidth in an efficient manner. It should be appreciated that if the image border which is not likely to be displayed is lost, there is little or no impact on final displayed image quality. The amount of cropping, in at least some embodiments, is a function of the amount of image scaling which is applied since the size of the image which is communicated in encoded form is cropped to be the same or approximately the same size as the original image.

Figure 11A:
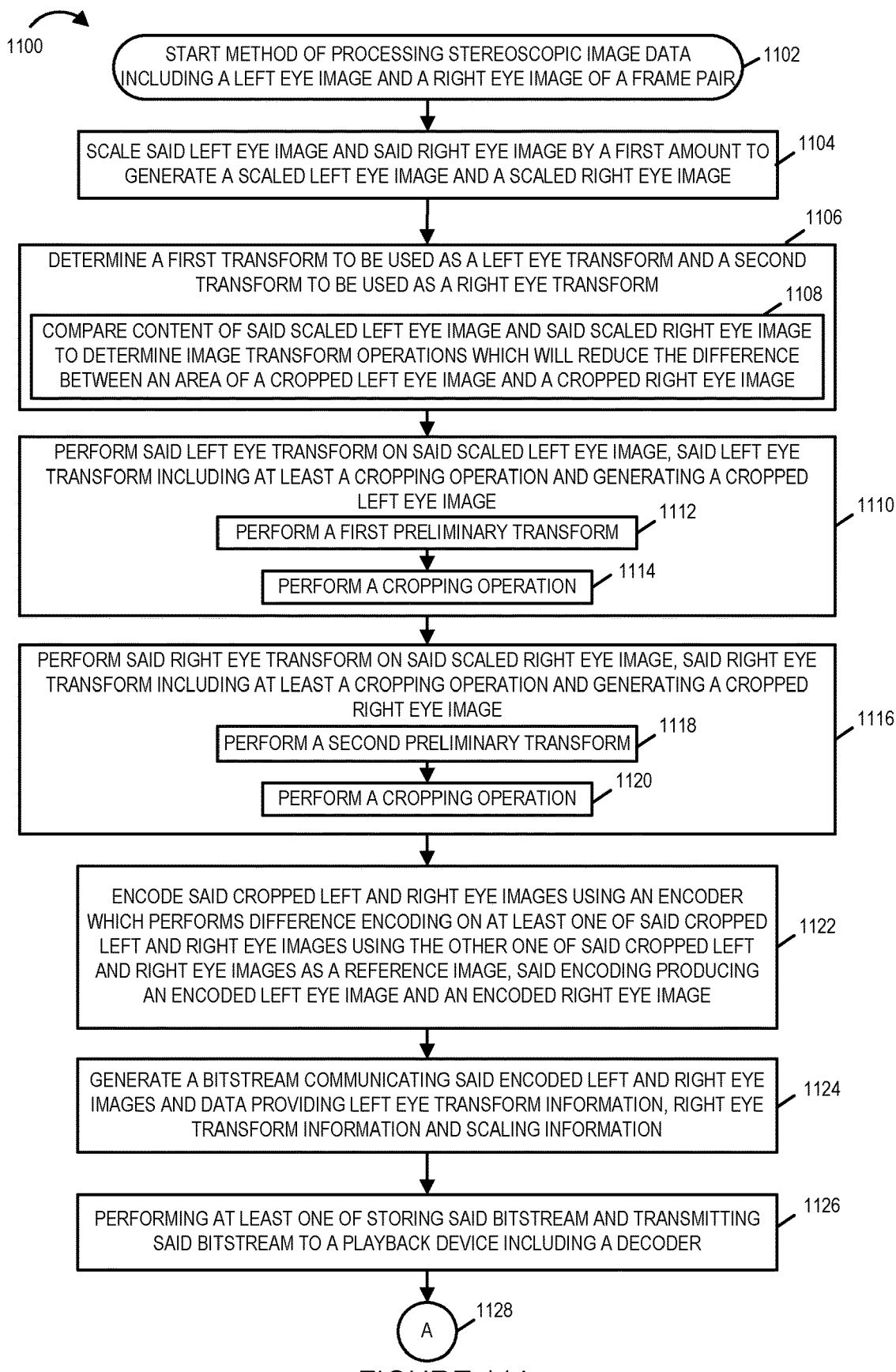
FIG. 11, comprising the combination of FIG. 11A and FIG. 11B, is a flowchart of an exemplary method of processing stereoscopic image data including a left eye image and a right eye image of a frame pair in accordance with various embodiments.
Figures 11, 11A, 11B:
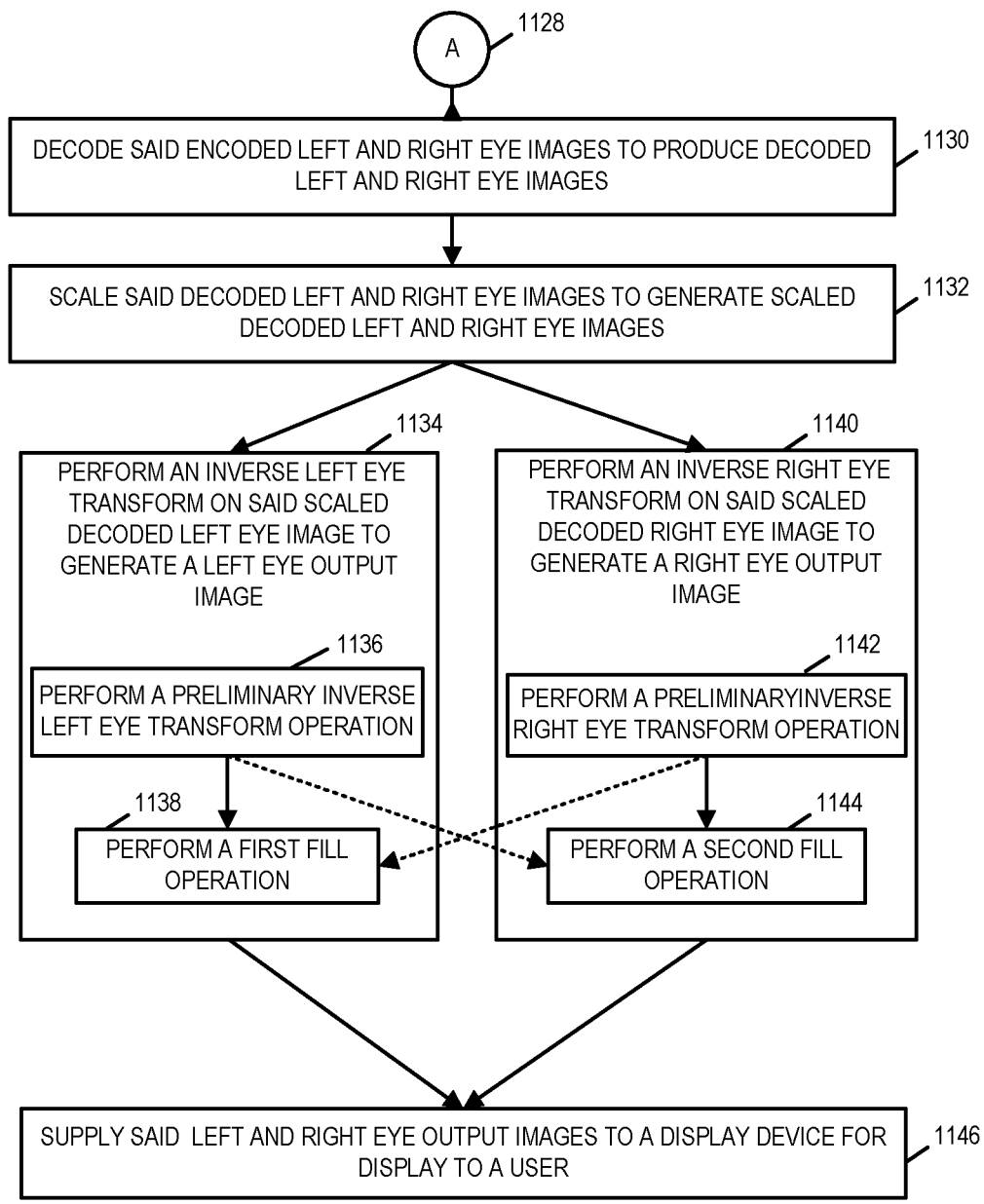

FIG. 11, comprising the combination of FIG. 11A and FIG. 11B, is a flowchart 1100 of an exemplary method of processing stereoscopic image data including a left eye image and a right eye image of a frame pair in accordance with various embodiments. Operation starts in step 1102, where an image processing device is powered on and initialized. Operation proceeds from step 1102 to step 1104. In step 1104 the image processing device scales said left eye image and said right eye image by a first amount to generate a scaled left eye image and a scaled right eye image. In some embodiments, the scaling is global and a global scaling parameter is used to control scaling of multiple frame pairs. Operation proceeds from step 1104 to step 1106. In step 1106 the image processing device determines a first transform to be used as a left eye transform and a second transform to be used as a right eye transform. Step 1106 includes step 1108 in which the image processing device compares content of said scaled left eye image and said scaled right eye image to determine image transform operations which will reduce the difference between an area of a cropped left eye image and a cropped right eye image. Operation proceeds from step 1106 to step 1110.

In step 1110 the image processing device performs said left eye transform on said scaled left eye image, said left eye transform including at least a cropping operation and generating a cropped left eye image. Step 1110 may, and sometimes does include step 1112, in which the image processing device performs a first preliminary transform. Step 1110 includes step 1114, in which the image processing device performs a cropping operation.

Operation proceeds from step 1110 to step 1116. In step 1116 the image processing device performs said right eye transform operation on said scaled right eye image, said right eye transform including at least a cropping operation and generating a cropped right eye image. Step 1116 may, and sometime does, include step 1118. In step 1118 the image processing device performs a second preliminary transform. Step 1116 includes step 1120, in which the image processing device performs a cropping operation.

In some embodiments, the area of the cropped left eye image is equal in size to the area of the left eye image, and the area of the cropped right eye image is equal in size to the area of the right eye image. In some embodiments, the area of the scaled left eye image is equal in size to the area of the scaled right eye image. In some such embodiments, the area of the scaled left eye image is larger than the area of left eye image. In various embodiments, the area of the left eye image is equal to the area of the right eye image.

In some embodiments, the left and right eye transforms each include a preliminary transform in addition to said cropping operation, said preliminary transform including at least one of: a null transform, shifting transform, an anamorphic scaling transform, keystone transform or warping transform. In some such embodiments, a first preliminary transform included in said left eye transform is equal and opposite to a second preliminary transform included in said right eye transform when said left and right eye transforms are non-null transforms.

In some embodiments, the scaling is global and a global scaling parameter is used to control scaling of multiple frame pairs. In some such embodiments, no change is made to said scaled left and right eye images to produce transformed left and right eye images generated by performing said first and second preliminary transforms on the scaled left and right eye images, respectively, when a null transform is used as said first preliminary transform and said second preliminary transform.

In some embodiments, the left eye transform includes a left eye image shift as a first preliminary transform; the right eye transform includes a right eye image shift as a second preliminary transform, and the right eye image shift is by an equal amount and opposite direction to said left eye image shift.

In some embodiments, the first preliminary transform of step 1112 includes a rotate and a skew, and the second preliminary transform of step 1118 includes a rotate and a skew. In some such embodiments, the rotate and skew of the first preliminary transform are independent, e.g., not exact inverses, of the rotate and skew of the second preliminary transform.

In some embodiments, the first preliminary transform of step 1112 includes a scale and a rotate, and the second preliminary transform of step 1118 includes a scale and a rotate. In some embodiments, the first preliminary transform of step 1112 includes a scale, a rotate, and a skew, and the second preliminary transform of step 1118 includes a scale, a rotate, and a skew.

Operation proceeds from step 1116 to step 1122. In step 1122, the image processing device encodes said cropped left and right eye images using an encoder which performs difference encoding on at least one said cropped left and right eye images using the other one of said cropped left and right eye images as a reference image, said encoding producing an encoded left eye image and an encoded right eye image. In some embodiments, the difference encoding includes motion compensating prediction encoding. Operation proceeds from step 1122 to step 1124. In step 1124 the image processing device generates a bitstream communicating said encoded left and right eye images and data providing left eye transform information, right eye transform information and scaling information. Operation proceeds from step 1124 to step 1126.

In step 1126 the image processing device performs at least one of storing said bitstream and transmitting said bitstream to a playback device including a decoder. Operation proceeds from step 1126 to step 1130 via connecting node A 1128.

In step 1130 the image processing device decodes said encoded left and right eye images to produce decoded left and right eye images. Operation proceeds from step 1130 to step 1132.

In step 1132 the image processing device scales said decoded left and right eye images to generate scaled decoded left and right eye images. In some embodiments, the scaling of step 1132 is by an amount which is the reciprocal of the first amount of step 1104. Operation proceeds from step 1132 to step 1134 and step 1140, which may be performed in parallel.

In step 1134 the image processing device performs an inverse left eye transform operation on said scaled decoded left eye image to generate a left eye output image. Step 1134 includes steps 1136 and 1138. In step 1136 the image processing device performs a preliminary inverse left eye transform operation. In some embodiments, the preliminary inverse left eye transform operation includes one of: a null transform, shifting transform, anamorphic scaling transform, keystone transform or warping transform. Operation proceeds from step 1136 to step 1138. In step 1138 the image processing device performs a first fill operation.

In step 1140 the image processing device performs an inverse right eye transform operation on said scaled decoded right eye image to generate a right eye output image. Step 1140 includes steps 1142 and 1144. In step 1142 the image processing device performs a preliminary inverse right eye transform operation. In some embodiments, the preliminary inverse right eye transform operation includes one of: a null transform, shifting transform, anamorphic scaling transform, keystone transform or warping transform. Operation proceeds from step 1142 to step 1144. In step 1144 the image processing device is operated to perform a second fill operation.

In some embodiments, the left and right eye output images are the same size as the decoded left and right eye images, respectively. In various embodiments, the left and right output eye images are the same size as the left and right eye images, respectively.

In some embodiments, the preliminary inverse left eye transform operation and the preliminary inverse right eye transform operation include first and second image shift operations respectively. In some such embodiments, the first and second image shift operations are equal in amount and opposite in direction.

In some embodiments, the preliminary inverse left eye transform operation includes a shift in an opposite the first preliminary shift performed as part of the left eye transform. In some such embodiments, the preliminary inverse right eye transform operation includes a shift in an opposite direction the second preliminary shift performed as part of the right eye transform.

In some embodiments, the preliminary inverse left eye transform operation includes a shift in an equal amount and opposite direction the first preliminary shift performed as part of the left eye transform, after taking into account the scaling. In some embodiments, the preliminary inverse right eye transform operation includes a shift in an equal amount and opposite direction the second preliminary shift performed as part of the left eye transform, after taking into account the scaling.

In some embodiments, the preliminary inverse left eye transform operation of step 1136 includes a rotate and a skew, and the preliminary inverse right eye transform operation of step 1142 includes a rotate and a skew. In some such embodiments, the rotate and skew of the preliminary inverse left eye transform operation of step 1136 are independent, e.g., not exact inverses, of the rotate and skew of the preliminary inverse right eye transform operation of step 1142.

In some embodiments, the preliminary inverse left eye transform operation of step 1136 includes a scale and a rotate, and the preliminary inverse right eye transform operation of step 1142 includes a scale and a rotate. In some embodiments, the preliminary inverse left eye transform operation of step 1136 includes a scale, a rotate, and a skew, and the preliminary inverse right eye transform operation of step 1142 includes a scale, a rotate, and a skew.

In some embodiments, the first fill operation of step 1138 in generating the left eye output image inserts a predetermined pattern, e.g., 50% gray. In some embodiments, the first fill operation of step 1138 in generating the left eye output image inserts image data copied from the result of the preliminary inverse right eye transform of step 1142. In some embodiments, the first fill operation of step 1138 in generating the left eye output image inserts some image data copied from the result of the preliminary inverse right eye transform of step 1142 and some image data which is a predetermined pattern, e.g., 50% gray.

In some embodiments, the second fill operation of step 1144 in generating the right eye output image inserts a predetermined pattern, e.g., 50% gray. In some embodiments, the second fill operation of step 1144 in generating the right eye output image inserts image data copied from the result of the preliminary inverse left eye transform of step 1136. In some embodiments, the second fill operation of step 1144 in generating the right eye output image inserts some image data copied from the result of the preliminary inverse left eye transform of step 1136 and some image data which is a predetermined pattern, e.g., 50% gray.

Operation proceeds from step 1134 and step 1140 to step 1146. In step 1146 the image processing device supplies the left and right eye output images to a display device for display to a user. In some embodiments the display device is included within the image processing device. In other embodiments, the display device is external to the image processing device.

In various embodiments, steps 1130, 1132, 1134, 1140 and 1146 are performed by the image processing device to be able to check that the expected recovered images viewed by a user operating a playback device will be acceptable. Thus a user of the image processing device implementing the method of flowchart 1100 can visually and/or analytically compare the left and right eye image to the left and right eye output images, to verify that the level of image degradation due to the processing is within acceptable limits.

In various embodiments, the steps of flowchart 1100 are repeated for multiple frames.

Figure 12:
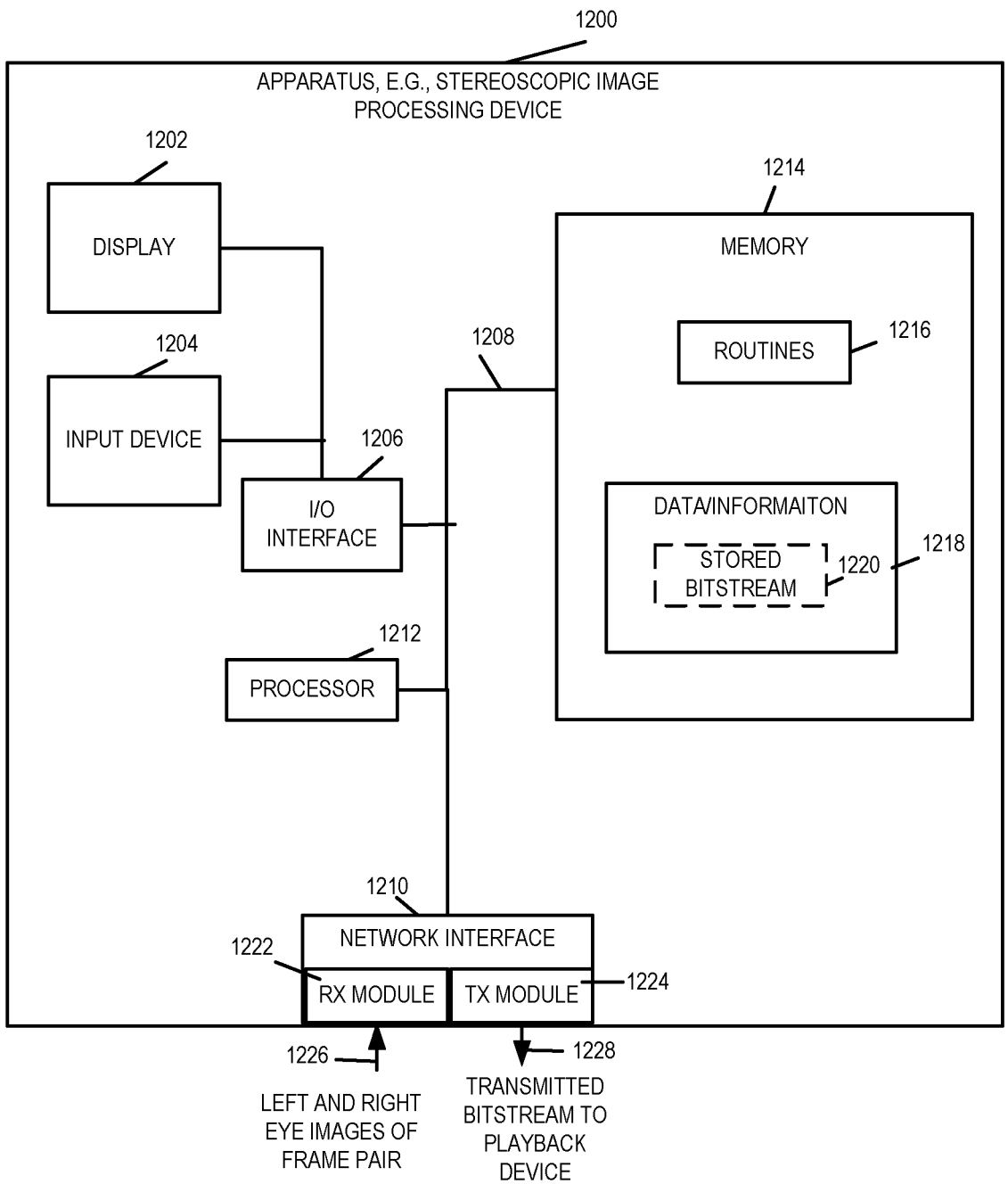
FIG. 12 illustrates an exemplary apparatus, e.g., a stereoscopic image processing device, implemented in accordance with various embodiments of the present invention.

FIG. 12 illustrates an exemplary apparatus 1200, e.g., a stereoscopic image processing device, implemented in accordance with various embodiments of the present invention. Apparatus 1200 includes a display 1202, input device 1204, e.g., a keyboard, input/output (I/O) interface 1206, a processor 1212, e.g., a CPU, network interface 1210 and a memory 1214 which are coupled together by bus 1208. The memory 1214 includes routines 1216 and data/information 1218. Processor 1212 executes routines 1216 and uses data/information 1218 in memory 1214 to implement steps of a method, e.g., a method in accordance with flowchart 1100 of FIG. 11. In some embodiments, data/information 1218 includes stored bitstream 1220. Network interface 1210 includes a receiver module 1222 and a transmitter module 1224. Left and right eye images of a frame pair of stereoscopic image data, e.g., data 1226, are received via receiver module 1222. Transmitter module 1224 transmits a bitstream, e.g., bitstream 1228, to a playback device.

In some embodiments, processor 1212 is configured to process stereoscopic image data including a left eye image and a right eye image of a frame pair. In some such embodiments, processor 1212 is configured to: scale said left eye image and said right eye image by a first amount to generate a scaled left eye image and a scaled right eye image; perform a left eye transform on said scaled left eye image, said left eye transform including at least a cropping operation and generating a cropped left eye image; and perform a right eye transform on said scaled right eye image, said right eye transform including at least a cropping operation and generating a cropped right eye image.

In various embodiments, processor 1212 is further configured to: encode said cropped left and right eye images using an encoder which performs difference encoding on at least one of said cropped left and right eye images using the other one of said cropped left and right eye images as a reference image, said encoding producing an encoded left eye image and an encoded right eye image. In some such embodiments, the difference encoding includes motion compensated prediction encoding.

In some embodiments, processor 1212 is configured to: determine a first transform to be used as said left eye transform and a second transform to be used as said right eye transform. In some such embodiments, processor 1212 is configured to compare content of said scaled left eye image and said scaled right eye image to determine image transform operations which will reduce the difference between an area of said cropped left eye image and said cropped right eye image, as part of being configured to determine a first and second transform.

In various embodiments, the area of said cropped left eye image is equal in size to the area of the left eye image, and the area of the cropped right eye image is equal in size to the area of the right eye image. In some embodiments, the area of the scaled left eye image is equal to the area of the scaled right eye image. In some such embodiments, the area of the scaled left eye image is larger than the area of the left eye image. In some embodiments, the area of the left eye image is equal to the area of the right eye image.

In various embodiments, the left and right eye transforms each include a preliminary transform in addition to said cropping operation, said preliminary transform including at least one of a null transform, shifting transform, anamorphic scaling transform, keystone transform or warping transform.

In some embodiments, a first preliminary transform included in said left eye transform is equal and opposite to a second preliminary transform included in said right eye transform when said left and right eye transforms are non-null transforms. In some such embodiments, said scaling is global and a global scaling parameter is used to control scaling of multiple frame pairs, and no change is made to said scaled left and right eye images to produce transformed left and right eye images generated by performing said first and second preliminary transforms on the scaled left and right eye images, respectively, when a null transform is used as said first preliminary transform and said second preliminary transform.

In some embodiments, said left eye transform includes a left eye image shift as a first preliminary transform; and said right eye transform includes a right eye image shift as a second preliminary transform, said right eye image shift being by an equal amount and in an opposite direction to said left eye image shift.

In some embodiments processor 1212 is further configured to: generate a bitstream communicating said encoded left and right eye images and data providing left eye transform information, right eye transform information and scaling information. In some such embodiments, processor 1212 is further configured to: perform at least one of storing said bitstream and transmitting said bitstream to a playback device including a decoder.

In various embodiments, processor 1212 is further configured to: decode said encoded left and right eye images to produce decoded left and right eye images; and scale said decoded left and right eye images to generate scaled decoded left and right eye images. In some such embodiments processor 1212 is further configured to: perform an inverse left eye transform on said scaled decoded left eye image to generate a left eye output image; and perform an inverse right eye transform on said scaled decoded right eye image to generate a right eye output image. In some such embodiments, processor 1212 is further configured to perform a first fill operation, as part of being configured to performing an inverse left eye transform; and processor 1212 is further configured to perform a second fill operation, as part of being configured to perform an inverse right eye transform operation. In various embodiments, said left and right eye output images are the same size as the decoded left and right eye images, respectively.

In some embodiments, processor 1212 is configured to perform a preliminary inverse left eye transform operation prior to performing said first fill operation, as part of being configured to perform an inverse left eye transform; and processor 1212 is configured to perform a preliminary inverse right eye transform operation prior to performing said second fill operation, as part of being configured to perform an inverse right eye transform. In various embodiments, said preliminary inverse left eye transform operation includes one of: a null transform, shifting transform, anamorphic scaling transform, keystone transform or warping transform. In various embodiments, said preliminary inverse right eye transform operation includes one of: a null transform, shifting transform, anamorphic scaling transform, keystone transform or warping transform.

In some embodiments, said preliminary inverse left eye transform operation and said preliminary inverse right eye transform operation include first and second image shift operations respectively, said first and second image shift operations being in equal amounts and opposite directions. In some embodiments, said preliminary inverse left eye transform includes a shift in an opposite direction the first preliminary shift performed as part of said left eye transform. In some such embodiments said preliminary inverse right eye transform includes a shift in opposite direction the second preliminary shift performed as part of said right eye transform. In some embodiments, said preliminary inverse left eye transform includes a shift in an equal amount and opposite direction the first preliminary shift performed as part of said left eye transform, after taking into account scaling. In some such embodiments said preliminary inverse right eye transform includes a shift in an equal amount and opposite direction the second preliminary shift performed as part of said right eye transform, after taking into account scaling.

In various embodiments, processor 1212 is further configured to supply said left and right eye output images to a display device for display to a user.

Figure 13A:
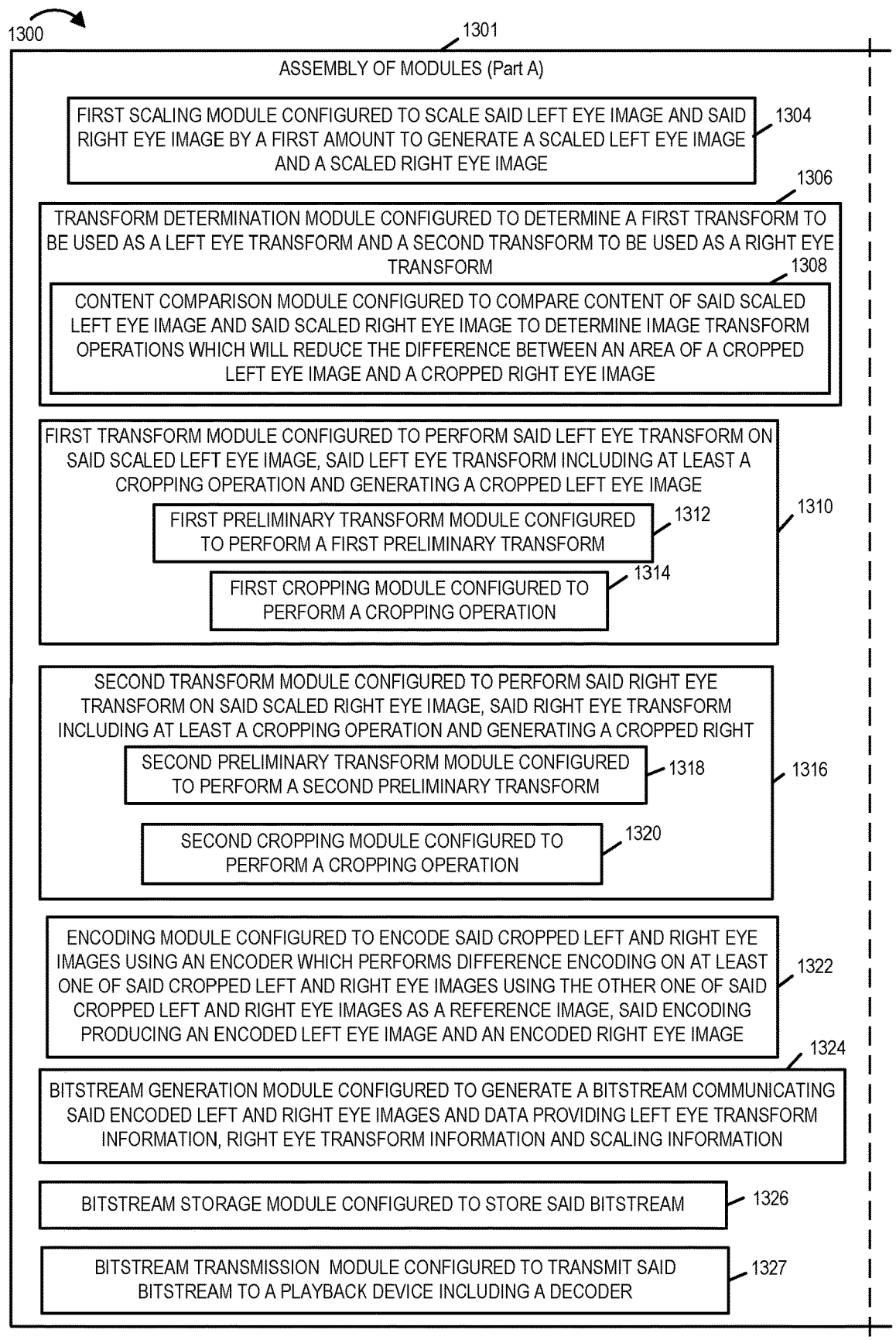
FIG. 13, comprising the combination of FIG. 13A and FIG. 13B, is a drawing of an assembly of modules which may be included in the apparatus of FIG. 12.
Figures 13, 13B:
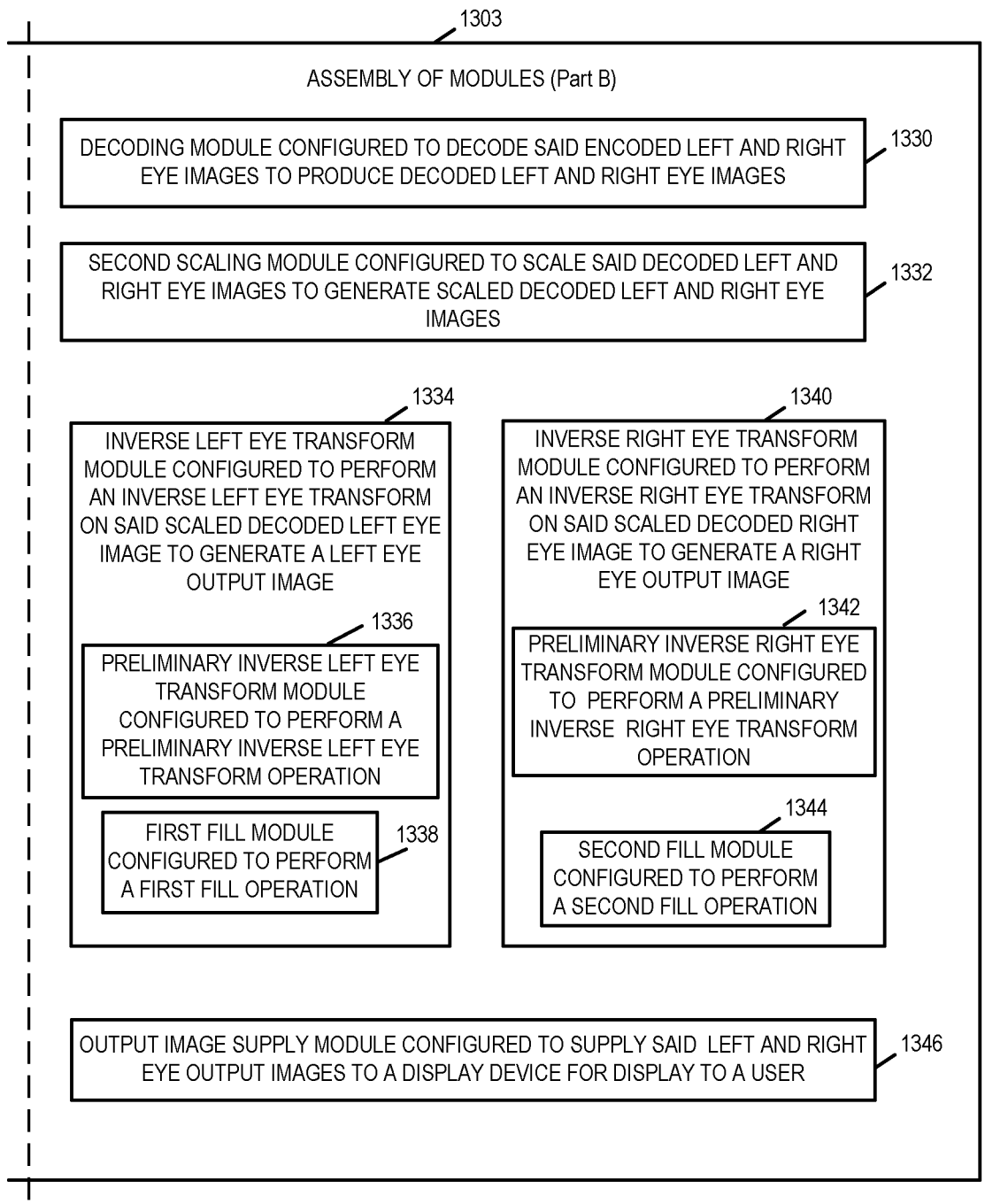

FIG. 13 is a drawing of an assembly of modules 1300 which can be, and in some embodiments is, used in the exemplary apparatus 1200 illustrated in FIG. 12. Assembly of modules 1300 includes Part A 1301 and Part B 1302. The apparatus including assembly of modules 1300 is, e.g., a stereoscopic image processing device which processes stereoscopic image data including a left eye image and a right eye image of a frame pair.

The modules in the assembly 1300 can be implemented in hardware within the processor 1212 of FIG. 12, e.g., as individual circuits. Alternatively, the modules may be implemented in software and stored in the memory 1214 of apparatus 1200 shown in FIG. 12. In some such embodiments, the assembly of modules 1300 is included in routines 1216 of memory 1214 of apparatus 1200 of FIG. 12. While shown in the FIG. 12 embodiment as a single processor, e.g., computer, it should be appreciated that the processor 1212 may be implemented as one or more processors, e.g., computers. When implemented in software the modules include code, which when executed by the processor, configure the processor, e.g., computer, 1212 to implement the function corresponding to the module. In some embodiments, processor 1212 is configured to implement each of the modules of the assembly of modules 1300. In embodiments where the assembly of modules 1300 is stored in the memory 1214, the memory 1214 is a computer program product comprising a computer readable medium, e.g., a non-transitory computer readable medium, comprising code, e.g., individual code for each module, for causing at least one computer, e.g., processor 1212, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 13 control and/or configure the apparatus 1200 or elements therein such as the processor 1212, to perform the functions of the corresponding steps illustrated and/or described in the method of flowchart 1200 of FIG. 12.

Assembly of modules 1300 includes a first scaling module 1304 configured to scale said left eye image and said right eye image by a first amount to generate a scaled left eye image and a scaled right eye image, and a transform determination module 1306 configured to determine a first transform to be used as a left eye transform and a second transform to be used as a right eye transform. Module 1306 includes a content comparison module 1308 configured to compare content of said scaled left eye image and said scaled right eye image to determine image transform operations which will reduce the difference between an area of a cropped left eye image and a cropped right eye image.

Assembly of modules 1300 further includes a first transform module 1310 configured to perform said left eye transform on said scaled left eye image, said left eye transform including at least a cropping operation and generating a cropped left eye image and a second transform module 1316 configured to perform said right eye transform on said scaled right eye image, said right eye transform including at least a cropping operation and generating a cropped right eye image. Module 1310 includes a first preliminary transform module 1312 configured to perform a first preliminary transform and a first cropping module 1314 configured to perform a cropping operation. Module 1316 includes a second preliminary transform module 1318 configured to perform a second preliminary transform and a second cropping module 1320 configured to perform a cropping operation.

Assembly of modules 1300 further includes an encoding module 1322 configured to encode said cropped left and right eye images using an encoder which performs difference encoding on at least one of said cropped left and right eye images using the other one of said cropped left and right eye images as a reference image, said encoding producing an encoded left eye image and an encoded right eye image, and a bitstream generation module 1324 configured to generate a bitstream communicating said encoded left and right eye images and data providing left eye transform information, right eye transform information and scaling information. Assembly of modules 1300 further includes a bitstream storage module 1326 configured to store said bitstream and a bitstream transmission module 1327 configured to transmit said bitstream, e.g., to a playback device including a decoder. Assembly of modules 1300 further includes a decoding module 1330 configured to decode said encoded left and right eye images to produce decoded left and right eye images, and a second scaling module 1332 configured to scale said decoded left and right eye images to generate scaled decoded left and right eye images. Assembly of modules 1300 further includes an inverse left eye transform module 1334 configured to perform an inverse left eye transform on said scaled decoded left eye image to generate a left eye output image and an inverse right eye transform module 1340 configured to perform an inverse right eye transform on said scaled decoded right eye image to generate a right eye output image. Module 1334 includes a preliminary inverse left eye transform module 1336 configured to perform a preliminary inverse left eye transform operation and a first fill module 1338 configured to perform a first fill operation. Module 1340 includes a preliminary inverse right eye transform module 1342 configured to perform a preliminary inverse right eye transform operation and a second fill module 1344 configured to perform a second fill operation.

Assembly of modules 1300 further includes an output image supply module 1346 configured to supply said left and right eye output images to a display device for display to a user.

In various embodiments, the difference encoding includes motion compensated predication encoding. In some embodiments, the area of the cropped right eye image is equal in size to the area of the left eye image, and the area of the cropped right eye image is equal in size to the right eye image. In various embodiments, the area of the scaled left eye image is larger than the area of the left eye image. In various embodiments, the area of the left eye image is equal to the area of the right eye image.

In some embodiments, the left and right eye transforms each include a preliminary transform in addition to said cropping operation, and the preliminary transform includes at least one of: a null transform, shifting transform, anamorphic scaling transform, keystone transform or warping transform. In some such embodiments, the first preliminary transform included in said left eye transform is equal in amount and opposite in direction to a second preliminary transform included in said right eye transform when the left and right eye transforms are non-null transforms.

In some embodiments, scaling is global and a global scaling parameter is used to control scaling of multiple frame pairs. In some such embodiments, no change is made to the scaled left and right eye images generated by performing said first and second preliminary transforms on the scaled left and right eye images, respectively, when a null transform is used as said first preliminary transform and said second preliminary transform.

In some embodiments, the left eye transform includes a left eye image shift as a first preliminary transform, and the right eye transform includes a right eye image shift as a second preliminary transform, said right eye image shift being by an equal amount and in an opposite direction to the left eye image shift.

In some embodiments, the first preliminary transform performed by module 1312 includes a rotate and a skew, and the second preliminary transform performed by module 1318 includes a rotate and a skew. In some such embodiments, the rotate and skew of the first preliminary transform are independent, e.g., not exact inverses, of the rotate and skew of the second preliminary transform.

In some embodiments, the first preliminary transform performed by module 1312 includes a scale and a rotate, and the second preliminary transform performed by module 1318 includes a scale and a rotate. In some embodiments, the first preliminary transform performed by module 1312 includes a scale, a rotate, and a skew, and the second preliminary transform performed by module 1318 includes a scale, a rotate, and a skew.

In some embodiments, the left and right eye output images are the same size as the decoded left and right eye images, respectively. In some embodiments, the first scaling module 1304 performs image enlargement by scaling by a first amount, and the second scaling module 1332 performs image reduction by scaling by a second amount. In some such embodiments, the second amount is a reciprocal of the first amount.

In some embodiments, the preliminary inverse left eye transform operation includes one of: a null transform, shifting transform, anamorphic scaling transform, keystone transform or warping transform. In some embodiments, the preliminary inverse right eye transform operation includes one of: a null transform, shifting transform, anamorphic scaling transform, keystone transform or warping transform. In some embodiments, the preliminary inverse left eye transform operation and the preliminary inverse right eye transform operation include first and second image shift operations respectively, and the first and second image shift operations are in equal amounts and opposite directions.

In various embodiments, the preliminary inverse left eye transform includes a shift in an opposite direction the first preliminary shift performed as part of said left eye transform. In various embodiments, the preliminary inverse right eye transform includes a shift in an opposite direction the second preliminary shift performed as part of said right eye transform. In various embodiments, the preliminary inverse left eye transform includes a shift in an equal amount and opposite direction the first preliminary shift performed as part of said left eye transform, after taking into consideration scaling. In various embodiments, the preliminary inverse right eye transform includes a shift in an equal amount and opposite direction the second preliminary shift performed as part of said right eye transform, after taking into consideration scaling. Thus in various embodiments, the preliminary inverse transforms undo the preliminary transforms, e.g., realigning the left eye output image with the left eye image and realigning the right eye output image with right eye image.

In some embodiments, the preliminary inverse left eye transform operation performed by module 1336 includes a rotate and a skew, and the preliminary inverse right eye transform operation performed by module 1342 includes a rotate and a skew. In some such embodiments, the rotate and skew of the preliminary inverse left eye transform operation are independent, e.g., not exact inverses, of the rotate and skew of the preliminary inverse right eye transform operation.

In some embodiments, the preliminary inverse left eye transform operation performed by module 1336 includes a scale and a rotate, and the preliminary inverse right eye transform operation performed by module 1342 includes a scale and a rotate. In some embodiments, the preliminary inverse left eye transform operation performed by module 1336 includes a scale, a rotate, and a skew, and the preliminary inverse right eye transform operation performed by module 1342 includes a scale, a rotate, and a skew.

In some embodiments, the first fill operation performed by module 1338 in generating the left eye output image inserts a predetermined pattern, e.g., 50% gray. In some embodiments, the first fill operation performed by module 1338 in generating the left eye output image inserts image data copied from the result of the preliminary inverse right eye transform of module 1342. In some embodiments, the first fill operation of module 1338 in generating the left eye output image inserts some image data copied from the result of the preliminary inverse right eye transform of module 1342 and some image data which is a predetermined pattern, e.g., 50% gray.

In some embodiments, the second fill operation performed by 1344 in generating the right eye output image inserts a predetermined pattern, e.g., 50% gray. In some embodiments, the second fill operation performed by module 1344 in generating the right eye output image inserts image data copied from the result of the preliminary inverse left eye transform performed by module 1336. In some embodiments, the second fill operation performed by module 1344 in generating the right eye output image inserts some image data copied from the result of the preliminary inverse left eye transform performed by module 1336 and some image data which is a predetermined pattern, e.g., 50% gray.

Figure 14:
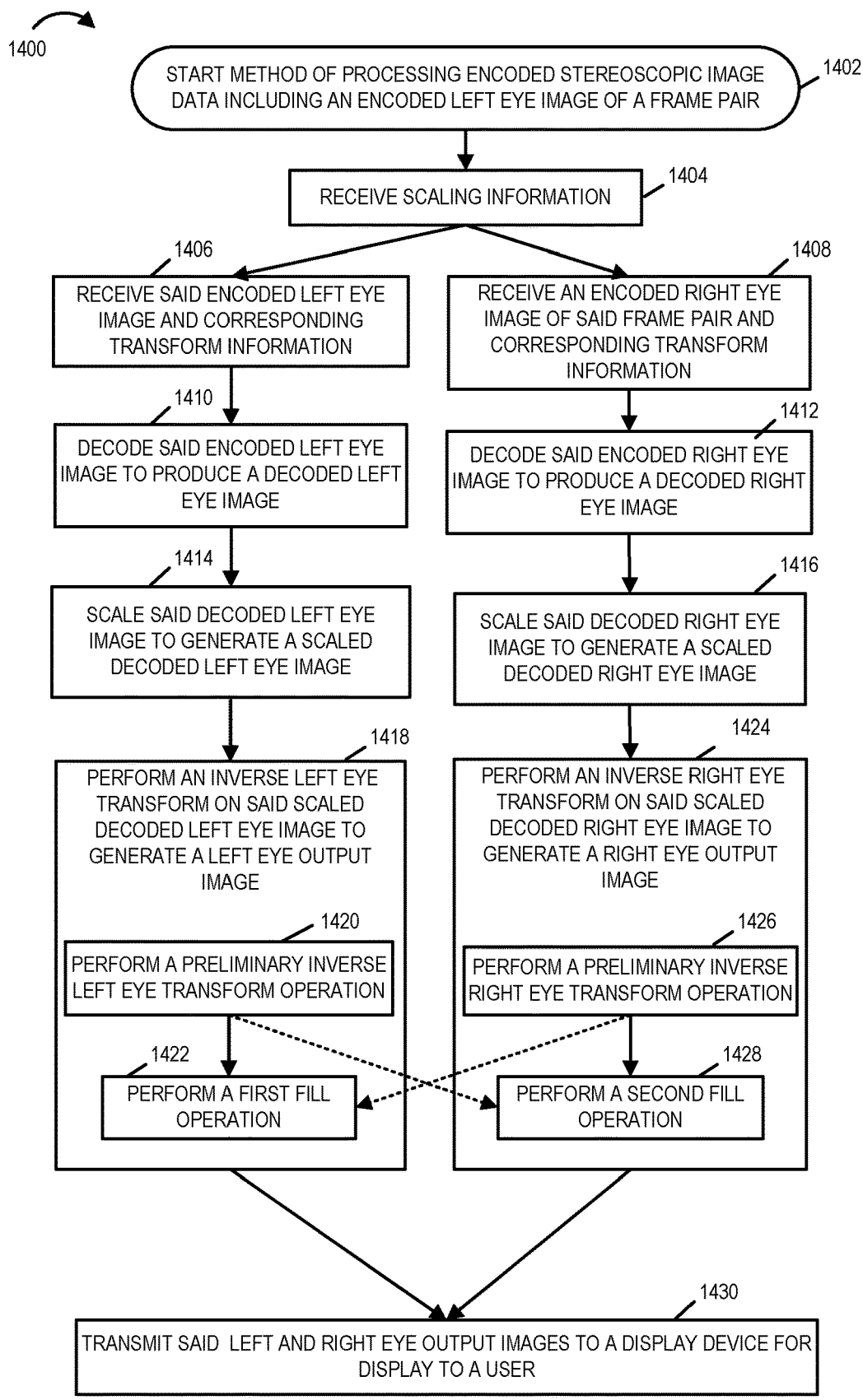
FIG. 14 is a flowchart of an exemplary method of processing encoded stereoscopic image data including an encoded left eye image of a frame pair in accordance with various embodiments.

FIG. 14 is a flowchart 1400 of an exemplary method of operating an image processing device to process encoded stereoscopic image data including an encoded left eye image of a frame pair in accordance with various exemplary embodiments. In various embodiments, the frame pair includes an encoded right eye image and the image processing device also processes the encoded right eye image. In step 1402 the image processing device is powered on and initialized. Operation proceeds from start step 1402 to step 1404, in which the image processing device receives scaling information. In some embodiments, the scaling is global, and a global scaling parameter is used to control scaling of multiple frame pairs. In some such embodiments, the global scaling parameter is received in the scaling information in step 1404. In various embodiments, the scaling reduces image size. Operation proceeds from step 1404 to steps 1406 and 1408. In step 1406 the image processing device receives said encoded left eye image and corresponding transform information. Operation proceeds from step 1406 to step 1410. In step 1410 the image processing device decodes said encoded left eye image to produce a decoded left eye image. Operation proceeds from step 1410 to step 1414. In step 1414 the image processing device scales the decoded left eye image to generate a scaled decoded left eye image. Operation proceeds from step 1414 to step 1418.

Returning to step 1408, in step 1408 the image processing device receives an encoded right eye image of said frame pair and corresponding transform information. Operation proceeds from step 1408 to step 1412. In step 1412 the image processing device decodes said encoded right eye image to produce a decoded right eye image. Operation proceeds from step 1412 to step 1416. In step 1416 the image processing device scales the decoded right eye image to generate a scaled decoded right eye image. Operation proceeds from step 1416 to step 1424.

Returning to step 1418, in step 1418 the image processing device performs an inverse left eye transform operation on said scaled decoded left eye image to generate a left eye output image. Step 1418 includes steps 1420 and 1422. In step 1420 the image processing device performs a preliminary inverse left eye transform operation. In some embodiments, the preliminary inverse left eye transform operation includes one of: a null transform, shifting transform, anamorphic scaling transform, keystone transform or warping transform. Operation proceeds from step 1420 to step 1422. In step 1422 the image processing device performs a first fill operation.

Returning to step 1424, in step 1424 the image processing device performs an inverse right eye transform operation on said scaled decoded right eye image to generate a right eye output image. Step 1424 includes steps 1426 and 1428. In step 1426 the image processing device performs a preliminary inverse right eye transform operation. In some embodiments, the preliminary inverse right eye transform operation includes one of: a null transform, shifting transform, anamorphic scaling transform, keystone transform or warping transform. Operation proceeds from step 1426 to step 1428. In step 1428 the image processing device performs a second fill operation.

In some embodiments, the left eye output image is the same size as the encoded left eye image, and the right eye output image is the same size as the encoded right eye image. In some such embodiments, the encoded left eye image is the same size as the encoded right eye image.

In some embodiments, the preliminary inverse left eye transform operation and the preliminary inverse right eye transform operation include first and second image shift operations respectively. In some such embodiments, the first and second image shift operations are equal in amount and opposite in direction.

In some embodiments, the scaling of said decoded left eye image and said decoded right eye image is by a first amount, said first amount being an amount indicated by information supplied along with at least one of said encoded left eye image and said encoded right eye image or prior to said left and right eye images being supplied. For example, the first amount is communicated in received scaling information of step 1404. In some embodiments, the inverse left eye transform operation includes a shift in a direction and amount which is based on left eye transform information supplied with said encoded left eye image, and the inverse right eye transform operation includes a shift in a direction and amount which is based on right eye transform information supplied with said encoded right eye image.

In some embodiments, the preliminary inverse left eye transform operation of step 1420 includes a rotate and a skew, and the preliminary inverse right eye transform operation of step 1426 includes a rotate and a skew. In some such embodiments, the rotate and skew of the preliminary inverse left eye transform operation are independent, e.g., not exact inverses, of the rotate and skew of the preliminary inverse right eye transform operation.

In some embodiments, the preliminary inverse left eye transform operation of step 1420 includes a scale and a rotate, and the preliminary inverse right eye transform operation of step 1426 includes a scale and a rotate. In some embodiments, the preliminary inverse left eye transform operation of step 1420 includes a scale, a rotate, and a skew, and the preliminary inverse right eye transform operation of step 1426 includes a scale, a rotate, and a skew.

In some embodiments, the first fill operation of step 1422 in generating the left eye output image inserts a predetermined pattern, e.g., 50% gray. In some embodiments, the first fill operation of step 1422 in generating the left eye output image inserts image data copied from the result of the preliminary inverse right eye transform of step 1426. In some embodiments, the first fill operation of step 1422 in generating the left eye output image inserts some image data copied from the result of the preliminary inverse right eye transform of step 1426 and some image data which is a predetermined pattern, e.g., 50% gray.

In some embodiments, the second fill operation of step 1428 in generating the right eye output image inserts a predetermined pattern, e.g., 50% gray. In some embodiments, the second fill operation of step 1428 in generating the right eye output image inserts image data copied from the result of the preliminary inverse left eye transform of step 1420. In some embodiments, the second fill operation of step 1428 in generating the right eye output image inserts some image data copied from the result of the preliminary inverse left eye transform of step 1420 and some image data which is a predetermined pattern, e.g., 50% gray.

Operation proceeds from step 1418 and step 1424 to step 1430. In step 1430 the image processing device supplies the left and right eye output images to a display device for display to a user. In some embodiments the display device is included within the image processing device implementing the method of flowchart 1400. In other embodiments, the display device is external to the image processing device implementing the method of flowchart 1400.

In various embodiments, the steps of flowchart 1500 are repeated for multiple frames.

Figure 15:
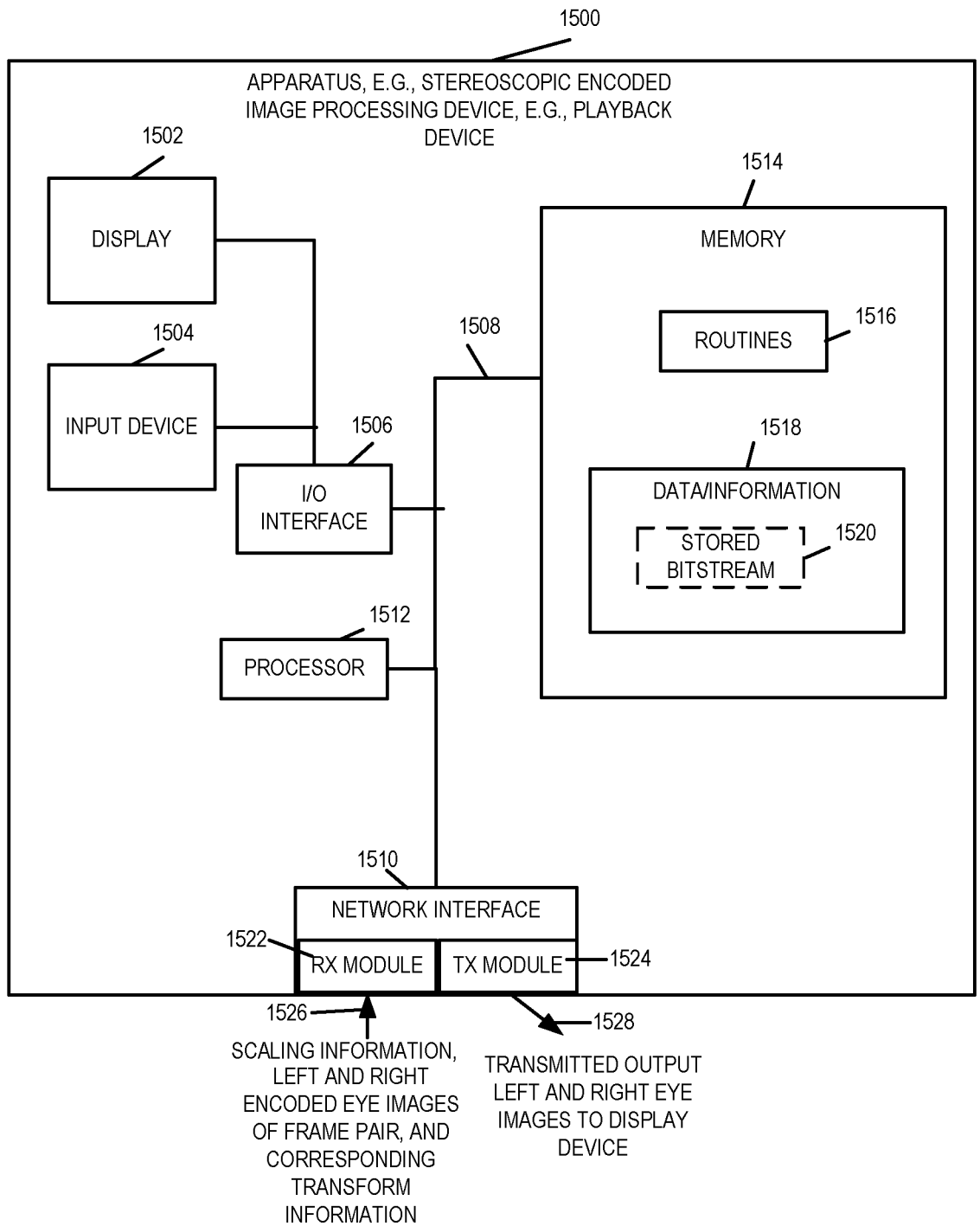
FIG. 15 illustrates an exemplary apparatus, e.g., a stereoscopic encoded image processing device, implemented in accordance with various embodiments of the present invention.

FIG. 15 illustrates an exemplary apparatus 1500, e.g., a stereoscopic encoded image processing device, e.g., a playback device, implemented in accordance with various embodiments of the present invention. Apparatus 1500 includes a display 1502, input device 1504, e.g., a keyboard, input/output (I/O) interface 1506, a processor 1512, e.g., a CPU, network interface 1510 and a memory 1514 which are coupled together by bus 1508. The memory 1514 includes routines 1516 and data/information 1518. Processor 1512 executes routines 1516 and uses data/information 1518 in memory 1514 to implement steps of a method, e.g., a method in accordance with flowchart 1400 of FIG. 14. In some embodiments, data/information 1518 includes stored bitstream 1520. Network interface 1510 includes a receiver module 1522 and a transmitter module 1526. Left and right encoded eye images of a frame pair of stereoscopic image data, e.g., data 1526, are received via receiver module 1522. Other information received via receiver module 1522 includes scaling information and transform information. In some embodiments, received information is stored, e.g., as part of stored bitstream 1520. In some embodiments, received information is used and processed directly. Transmitter module 1524 transmits output left and right eye images 1528, e.g., to a display device.

In some embodiments, processor 1512 is configured to process encoded stereoscopic image data including an encoded left eye image of a frame pair. In some such embodiments, processor 1512 is also configured to process encoded right eye image data of the frame pair. In various embodiments, processor 1512 is configured to: decode said encoded left eye image to produce a decoded left eye image; scale said decoded left eye images to generate a scaled decoded left eye image; and perform an inverse left eye transform on said scaled decoded left eye image to generate a left eye output image, wherein performing an inverse left eye transform includes performing a first fill operation. In some such embodiments, said frame pair includes an encoded right eye image, and processor 1512 is further configured to decode said encoded right eye image to produce a decoded right eye image; scale said decoded right eye image to generate a scaled decoded right eye image; and perform an inverse right eye transform on said scaled decoded right eye image to generate a right eye output image, wherein performing an inverse right eye transform includes performing a second fill operation. In some such embodiments, processor 1512 is further configured to: transmit said left and right eye output images to a display device.

In various embodiments, the left eye output image is the same size as said encoded left eye image, and the right eye output image is the same size as said encoded right eye image. In some such embodiments, the encoded left eye image is the same size as said encoded right eye image.

In some embodiments, processor 1512 is configured to perform a preliminary inverse left eye transform operation prior to performing said first fill operation, as part of being configured to perform an inverse left eye transform; and processor 1512 is further configured to perform a preliminary inverse right eye transform operation prior to performing said second fill operation, as part of being configured to perform an inverse right eye transform.

In some embodiments, the preliminary inverse left eye transform operation includes one of: a null transform, shifting transform, anamorphic scaling transform, keystone transform or warping transform. In some such embodiments, the preliminary inverse right eye transform operation includes one of: a null transform, shifting transform, anamorphic scaling transform, keystone transform or warping transform.

In some embodiments, the preliminary inverse left eye transform operation and said preliminary inverse right eye transform operation include first and second image shift operations respectively, said first and second image shift operations being in equal amounts and opposite directions.

In some embodiments, the scaling of said left eye image and said right eye image is by a first amount, said first amount being an amount indicated by information supplied along with at least one of said encoded left eye image and said encoded right eye image or prior to said encoded left and right eye images being supplied. In some embodiments, processor 1512 is configured to receive a global scaling parameter which applies to multiple frame pairs. In some embodiments, the inverse left eye transform includes a shift in a direction and amount which is based on left eye transform information supplied with said encoded left eye image; and the inverse right eye transform includes a shift in a direction and amount which is based on right eye transform information supplied with said encoded right eye image. In some such embodiments, processor 1512 is configured to receive an encoded left eye image and corresponding transform information and an encoded right eye image and corresponding transform information.

In some embodiments, the scaling is global and a global scaling parameter is used to control scaling of multiple frame pairs. In various embodiments, the scaling reduces image size.

In some embodiments, apparatus 1500 is a playback device, which performs said decoding, scaling, transforming and filling step. In various embodiments, processor 1512 is configured to supply said left and right eye output images to a display device for display to a user. The display device may be included in apparatus 1500 or external to apparatus 1500.

Figure 16:
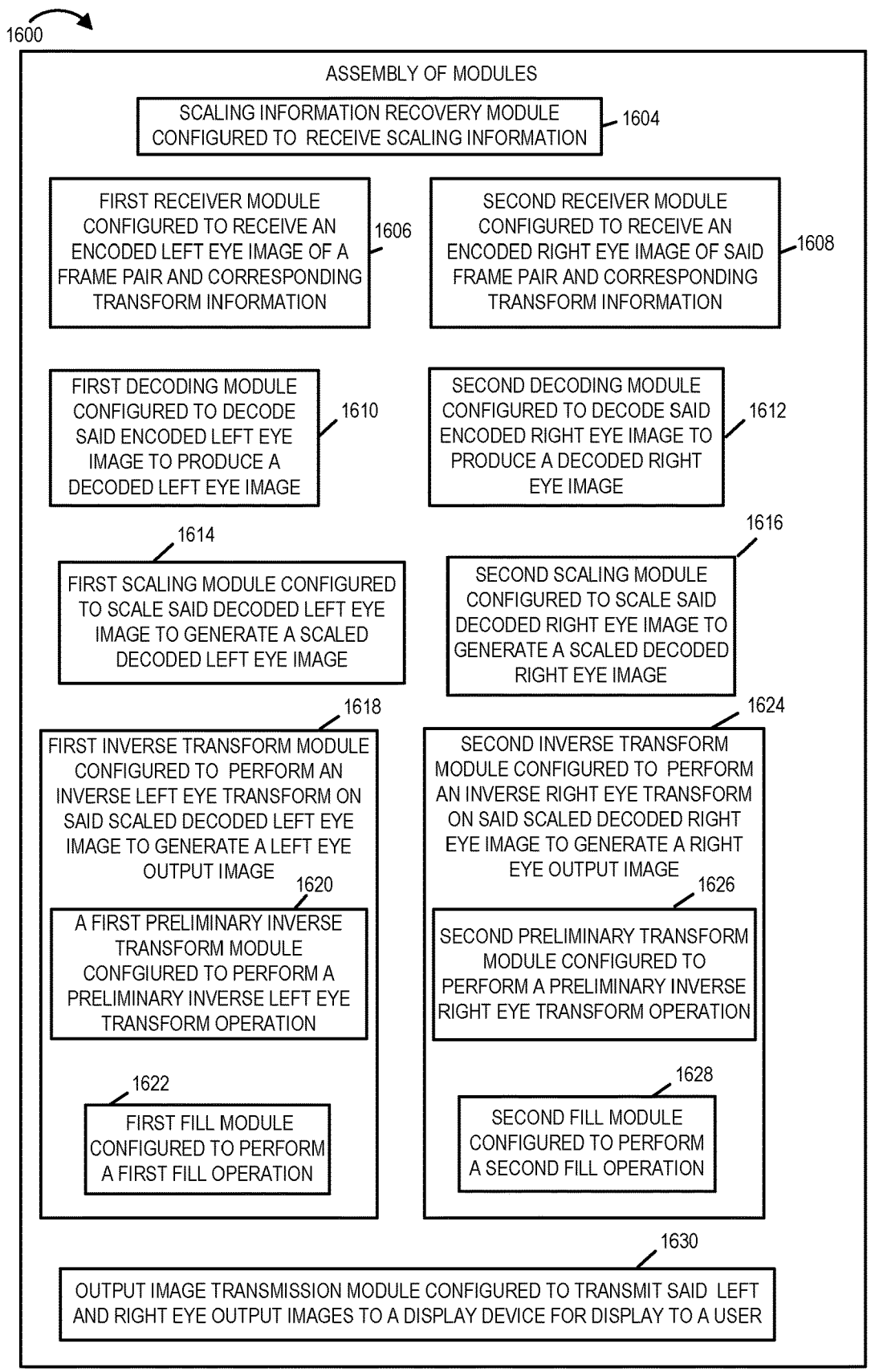
FIG. 16 is a drawing of an assembly of modules which may be included in the apparatus of FIG. 15.

FIG. 16 is an assembly of modules 1600 which can, and in some embodiments is, used in the exemplary apparatus 1500 illustrated in FIG. 15. The apparatus including assembly of modules 1600 is, e.g., a device which processes encoded stereoscopic image data including an encoded left eye image and an encoded right eye image of a frame pair. In some embodiments, the apparatus including assembly of modules 1600 is a playback device.

The modules in the assembly 1600 can be implemented in hardware within the processor 1512 of FIG. 15, e.g., as individual circuits. Alternatively, the modules may be implemented in software and stored in the memory 1514 of apparatus 1500 shown in FIG. 15. In some such embodiments, the assembly of modules 1600 is included in routines 1516 of memory 1514 of apparatus 1500 of FIG. 15. While shown in the FIG. 15 embodiment as a single processor, e.g., computer, it should be appreciated that the processor 1512 may be implemented as one or more processors, e.g., computers. When implemented in software the modules include code, which when executed by the processor, configure the processor, e.g., computer, 1512 to implement the function corresponding to the module. In some embodiments, processor 1512 is configured to implement each of the modules of the assembly of modules 1600. In embodiments where the assembly of modules 1600 is stored in the memory 1514, the memory 1514 is a computer program product comprising a computer readable medium, e.g., a non-transitory computer readable medium, comprising code, e.g., individual code for each module, for causing at least one computer, e.g., processor 1512, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 16 control and/or configure the apparatus 1500 or elements therein such as the processor 1512, to perform the functions of the corresponding steps illustrated and/or described in the method of flowchart 1400 of FIG. 14.

Assembly of modules 1600 includes a scaling information recovery module 1604 configured to receive scaling information, a first receiver module 1606 configured to receive an encoded left eye image of a frame pair and corresponding transform information, a second receiver module 1608 configured to receive an encoded right of image of a frame pair and corresponding transform information, a first decoding module 1610 configured to decode said encoded left eye image to produce a decoded left eye image, a second decoding module 1612 configured to decode said encoded right eye image to produce a decoded right eye image, a first scaling module 1614 configured to scale said decoded left eye image to generate a scaled decoded left eye image, and a second scaling module 1616 configured to scale said decoded right eye image to generate a scaled decoded right eye image. Assembly of modules 1600 further includes a first inverse transform module 1618 configured to perform an inverse left eye transform on said scaled decoded left eye image to generate a left eye output image, a second inverse transform module 1624 configured to perform an inverse right eye transform on said scaled decoded right eye image to generate a right eye output image, and an output image transmission module 1630 configured to transmit said left and right eye output images to a display device for display to a user.

First inverse transform module 1618 includes a first preliminary inverse transform module 1620 configured to perform an inverse left eye transform operation 1620 and a first fill module 1622 configured to perform a first fill operation. Second inverse transform module 1624 includes a second preliminary inverse transform module 1626 configured to perform an inverse right eye transform operation 1626 and a second fill module 1628 configured to perform a second fill operation.

In various embodiments, said left eye output image is the same size as said encoded left eye image, and said right eye output image is the same size as said encoded right eye image. In some such embodiments, the encoded left eye image is the same size as said encoded right eye image.

In some embodiments, the preliminary inverse left eye transform operation performed by module 1620 includes one of: a null transform, shifting transform, anamorphic scaling transform, keystone transform or warping transform. In some such embodiments, the preliminary inverse right eye transform operation performed by module 1626 includes one of: a null transform, shifting transform, anamorphic scaling transform, keystone transform or warping transform.

In some embodiments, the preliminary inverse left eye transform operation and said preliminary inverse right eye transform operation, performed by modules 1602 and 1626, respectively, include first and second image shift operations respectively, said first and second image shift operations being in equal amounts and opposite directions.

In some embodiments, said scaling of said left eye image by module 1614 and said right eye image by module 1616 is by a first amount, said first amount being an amount indicated by information supplied along with at least one of said encoded left eye image and said encoded right eye image or prior to said encoded left and right eye images being supplied. For example, module 1604 recovers the first amount prior to modules 1606 and 1608 receiving encoded image information. In some embodiments, said inverse left eye transform includes a shift in a direction and amount which is based on left eye transform information supplied with said encoded left eye image, and the inverse right eye transform includes a shift in a direction and amount which is based on right eye transform information supplied with said encoded right eye image.

In some embodiments, said scaling is global and a global scaling parameter is used to control scaling of multiple frame pairs. In various embodiments, the scaling performed by modules 1614 and 1616 reduces image size.

In some embodiments, the preliminary inverse left eye transform operation performed by module 1620 includes a rotate and a skew, and the preliminary inverse right eye transform operation performed by module 1626 includes a rotate and a skew. In some such embodiments, the rotate and skew of the preliminary inverse left eye transform operation are independent, e.g., not exact inverses, of the rotate and skew of the preliminary inverse right eye transform operation.

In some embodiments, the preliminary inverse left eye transform operation performed by module 1620 includes a scale and a rotate, and the preliminary inverse right eye transform operation performed by module 1626 includes a scale and a rotate. In some embodiments, the preliminary inverse left eye transform operation performed by module 1620 includes a scale, a rotate, and a skew, and the preliminary inverse right eye transform operation performed by module 1626 includes a scale, a rotate, and a skew.

In some embodiments, the first fill operation performed by module 1622 in generating the left eye output image inserts a predetermined pattern, e.g., 50% gray. In some embodiments, the first fill operation performed by module 1622 in generating the left eye output image inserts image data copied from the result of the preliminary inverse right eye transform performed by module 1626. In some embodiments, the first fill operation performed by module 1622 in generating the left eye output image inserts some image data copied from the result of the preliminary inverse right eye transform performed by module 1626 and some image data which is a predetermined pattern, e.g., 50% gray.

In some embodiments, the second fill operation performed by module 1628 in generating the right eye output image inserts a predetermined pattern, e.g., 50% gray. In some embodiments, the second fill operation performed by module 1628 in generating the right eye output image inserts image data copied from the result of the preliminary inverse left eye transform performed by module 1620. In some embodiments, the second fill operation performed by module 1628 in generating the right eye output image inserts some image data copied from the result of the preliminary inverse left eye transform performed by module 1620 and some image data which is a predetermined pattern, e.g., 50% gray.

Figure 17:
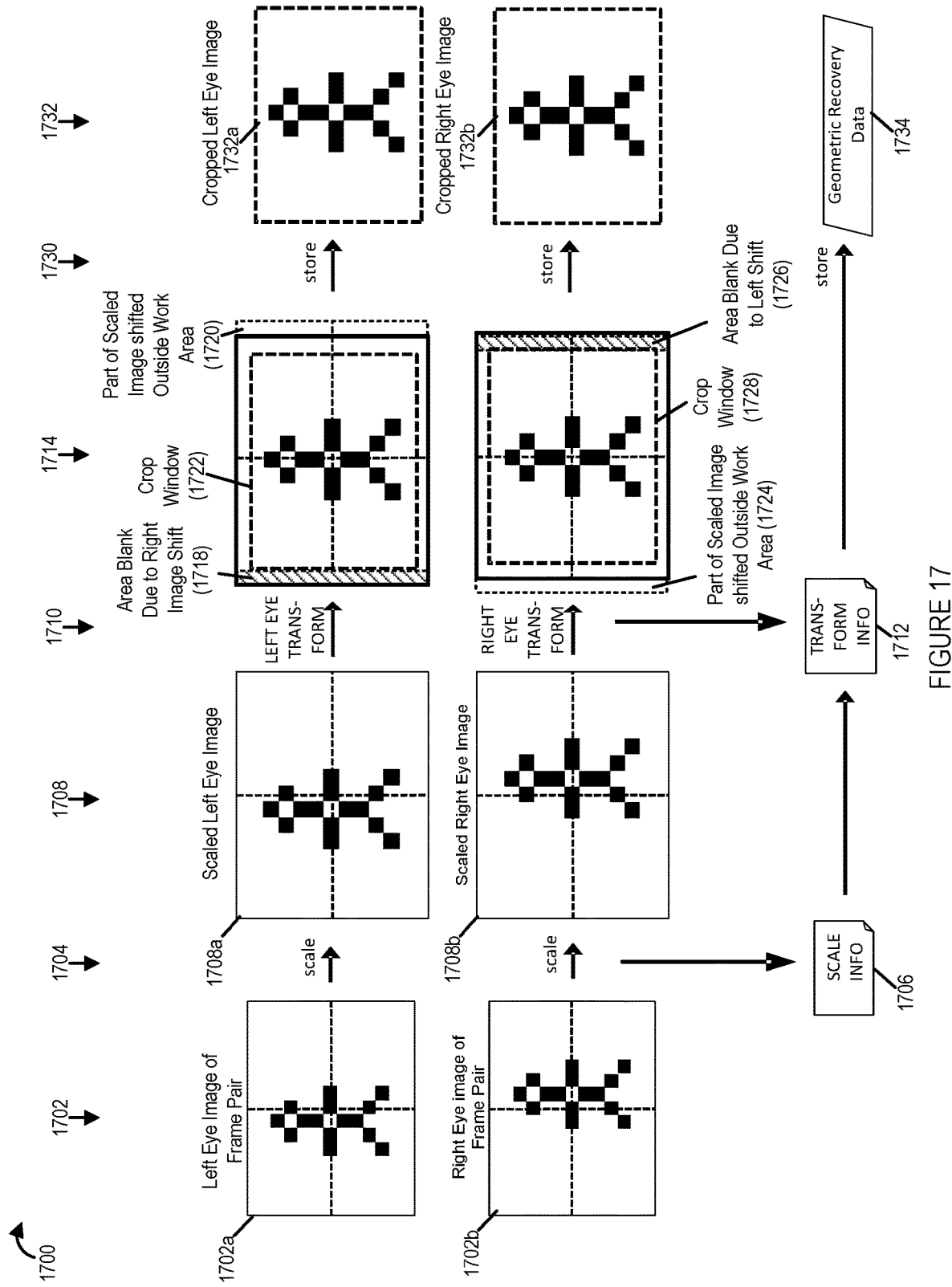
FIG. 17 illustrates an example of processing stereoscopic image data including a left eye image and a right eye image of a frame pair in accordance with an exemplary embodiment.

Drawing 1700 of FIG. 17 illustrates exemplary operations for processing stereoscopic image data including a left eye image and a right eye image of a frame pair in accordance with an exemplary embodiment. Column 1702 illustrates an exemplary left eye image of a frame pair 1702*a* and an exemplary right eye image of the frame pair 1702*b*.

Column 1704 illustrates that scaling operations are performed in accordance with the scaling information 1706. In this example, the scaling amount is the same for both the left and right eye images, and the scaling increases the image size. In various embodiments, the same scaling is used for a plurality of successive frames. Column 1708 illustrates the output of the scaling. Scaled left eye image 1708*a* is generated by scaling left eye image 1702*a* and scaled right eye image 1708*b* is generated by scaling right eye image 1702*b*.

Column 1710 indicates that left and right eye transforms are performed, and left and right eye transform information is stored in transform information 1712. Column 1714 illustrates sub-steps included in the transforms including preliminary transform operations, e.g., shifting, and cropping. Column 1730 illustrates that the results of the transform are stored. Column 1732 illustrates the output from the transforms.

The left eye transform includes a first preliminary transform and a first cropping operation. The right eye transform includes a second preliminary transform and a second cropping operation. The input to the left eye transform is the scaled left eye image 1708*a* and the output of the left eye transform is the cropped left eye image 1732*a*. In this example, the first preliminary transform is a right shift. Area 1718 is a blank area due to the right image shift; area 1720 is a part of the scaled image which has been shifted outside the work area; and area 1722 is a crop window. The area within crop window 1722 is the output which is stored as cropped left eye image 1732*a*. It should be appreciated that the area of the shifted scaled left eye image outside the crop window is lost as part of the left eye transform operations.

The input to the right eye transform is the scaled right eye image 1708*b* and the output of the right eye transform is the cropped right eye image 1732*b*. In this example, the second preliminary transform is a left shift. In this example, the second preliminary transform is equal in amount and opposite in direction with regard to the first preliminary transform. Area 1726 is a blank area due to the left image shift; area 1724 is a part of the scaled image which has been shifted outside the work area; and area 1728 is a crop window. The area within crop window 1728 is the output which is stored as cropped right eye image 1732*b*. It should be appreciated that the area of the shifted scaled right eye image outside the crop window is lost as part of the right eye transform operations.

Scale information 1706 and transform information 1712 or information derived there from are stored, e.g., as geometric recovery information 1734. In some embodiments, the information stored in geometric recovery information represents the scaling and transform performed in FIG. 17. In some embodiments, the information stored, e.g., as geometric recovery information, is information that can be used to undo the scaling and transforms of FIG. 17, e.g., a scaling factor which is an inverse to the scaling factor of FIG. 17, and inverse transform information to undo transforms of FIG. 17.

The cropped left eye image and cropped right eye image are encoded to produce an encoded left eye image and an encoded right eye image. In various embodiments, the encoder performs difference encoding on at least one of the cropped left eye image and cropped right eye image using the other one of the cropped left eye image and cropped right eye image as a reference image.

In various embodiments, a bitstream is generated including scaling information, left eye image transform information, right eye transform information, the encoded left eye image and the encoded right eye image.

Operations described in the example of FIG. 17 may be performed in accordance with the method of flowchart 1100 of FIG. 11, by apparatus 1200 of FIG. 12 and/or by an apparatus including assembly of modules 1300 of FIG. 13.

Figure 18:
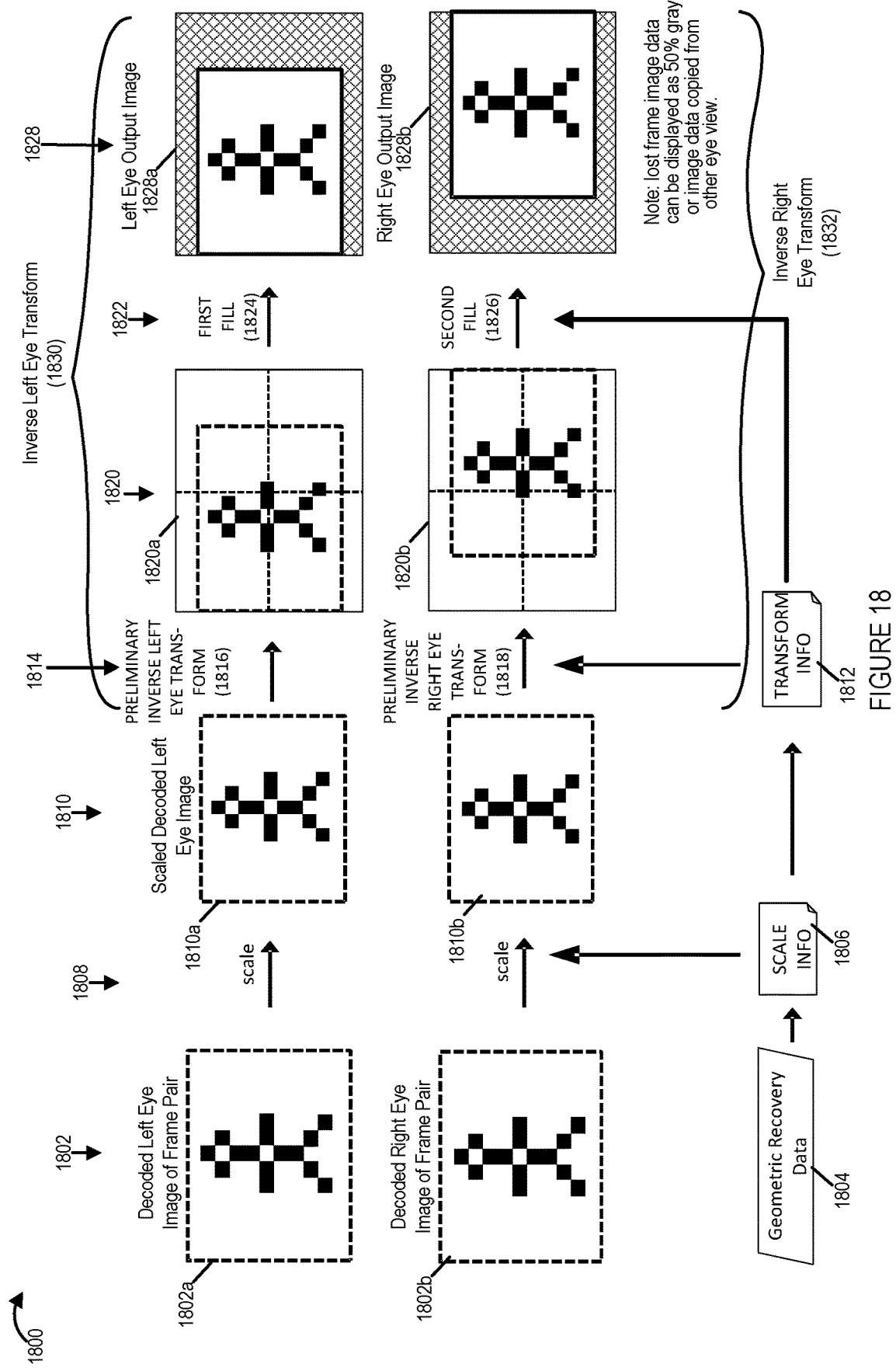
FIG. 18 illustrates an example of processing decoded processed stereoscopic image data in accordance with an exemplary embodiment.

Drawing 1800 of FIG. 18 illustrates exemplary operations for processing processed stereoscopic image data in accordance with an exemplary embodiment. Column 1802 illustrates an exemplary decoded left eye image of a frame pair 1802a and an exemplary decoded right eye image 1802b. Consider that cropped left eye image 1732a of FIG. 17 was used to produce an encoded left eye image, which was decoded to produce decoded left eye image 1802a. Consider that decoded left eye image 1802a is a copy of cropped left eye image 1732a. Consider that cropped right eye image 1732b of FIG. 17 was used to produce an encoded right eye image, which was decoded to produce decoded right eye image 1802b. Consider that decoded right eye image 1802b is a copy of cropped right eye image 1732b. Consider that geometric recover data 1804 is also available, e.g., data 1804 has been received by the device implementing the operations of FIG. 18. Further consider that geometric recover data is 1804 is a copy of geometric recovery data 1734 of FIG. 17.

Column 1808 indicates that the decoded left and right eye images are scaled in accordance with scale information 1806. In this example, the scaling amount applied is the same for both the left and right decoded eye images, and the scaling decreases the image size. In various embodiments, the same scaling is used for a plurality of successive frames. In some embodiments the amount of scaling used in the scaling of column 1808 is the reciprocal of the amount of scaling used in column 1704. Column 1810 illustrates the output of the scaling. Scaled decoded left eye image 1810a is generated by scaling decoded left eye image 1802a and scaled decoded right eye image 1810b is generated by scaling decoded right eye image 1802b.

Inverse transforms are performed on the scaled decoded eye images of column 1810 to generate the output eye images of column 1828. The inverse transforms include preliminary inverse transforms indicated in column 1814 and fill operations indicated in column 1822. Column 1820 indicates results of the preliminary inverse transforms.

An inverse left eye transform 1830 is performed on the scaled decoded left eye image 1810a to generate left eye output image 1828a. An inverse right eye transform 1832 is performed on the scaled decoded right eye image 1810b to generate right eye output image 1828b. Inverse left eye transform 1830 includes a preliminary inverse left eye transform 1816 and a first fill operation 1824. In this example, the preliminary inverse left eye transform is a left shift operation which generates image 1820a. Inverse right eye transform 1832 includes a preliminary inverse right eye transform 1818 and a second fill operation 1826. In this example, the preliminary inverse right eye transform is a right shift operation which generates image 1820b. In various embodiments, the preliminary inverse left eye transform is equal and opposite the preliminary inverse right eye transform. In some embodiments, the preliminary inverse transforms undo preliminary transforms previously performed, e.g., the inverse preliminary transforms of column 1814 undo the transforms of column 1710 of FIG. 17.

In left eye output image 1828a the area which has been filled by the first fill operation 1824 is represented by crosshatch shading. In right eye output image 1828b the area which has been filled by the second fill operation 1826 is represented by crosshatch shading. The fill operations are used to fill in lost frame image data.

In some embodiments, some or all of the lost frame image data is displayed as a predetermined pattern, e.g. 50% gray. In some embodiments, some of all of the lost frame image data is copied from the other eye output image. In some embodiments, a portion of the lost frame image data is displayed as a predetermined pattern, e.g., 50% gray, and a portion of the lost frame data is copied from the other eye output image. For example, in one embodiment, the top and bottom portions of the left and right eye output images which correspond to lost data are displayed as a predetermined pattern, e.g., 50% gray; in the left eye output image some lost frame data on the right side is copied from the right eye output image; and in the right eye output image some lost frame data on the left side is copied from the left eye output image.

Operations described in the example of FIG. 18 may be performed in accordance with the method of flowchart 1100 of FIG. 11 and/or in accordance with the method of flowchart 1400 of FIG. 14, by apparatus 1200 of FIG. 12, by apparatus 1500 of FIG. 15, by an apparatus including assembly of modules 1300 of FIG. 13, and/or by an apparatus including assembly of modules 1600 of FIG. 16.

FIGS. 17 and 18 are not to the same scale but are intended for purposes of explaining the various processing operations. Furthermore, while the direction of image shifts is properly displayed the exact end position of the man figures may not be precisely shown when comparing FIGS. 17 to 18. For example in an actual implementation the man figure in the left eye output image 1828a would end up in the same position as the man figure in the input left eye image 1702a. Similarly, in an actual implementation the man figure in the right eye output image 1828b would end up in the same position as the man figure in the input left eye image 1702b.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some embodiments, include compression. Similarly, decoding may involve decompression.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Some embodiments are directed to a processor configured to implement some or all of the steps of the methods described herein. Other embodiments are directed to machine, e.g., computer, readable medium including machine, e.g., computer, executable code for controlling a computer to implement the steps of the methods(s) described herein. In at least some embodiments the machine readable medium includes individual code corresponding to each recited step, the code including one or more computer executable instructions.

Numerous additional variations on the methods and apparatus of the various embodiments described above will be apparent to those skilled in the art in view of the above description. Such variations are to be considered within the scope.

What is claimed is:

1. A method of operating a content playback device, comprising:
    receiving geometric recovery data corresponding to a stereoscopic frame pair;
    receiving an encoded left eye image of the stereoscopic frame pair;
    receiving an encoded right eye image of the stereoscopic frame pair;
    decoding the encoded left eye image of the stereoscopic frame pair to produce a decoded left eye image;
    scaling said decoded left eye image to generate a scaled decoded left eye image; and
    performing an inverse left eye transform on said scaled decoded left eye image to generate a left eye output image, wherein performing an inverse left eye transform includes performing both: i) a shift in a direction and amount which is based on received left eye transform information and ii) a first fill operation;
    decoding said encoded right eye image of the stereoscopic frame pair to produce a decoded right eye image;
    scaling said decoded right eye image to generate a scaled decoded right eye image;
    performing an inverse right eye transform on said scaled decoded right eye image to generate a right eye output image, wherein performing an inverse right eye transform includes performing both: i) a shift in a direction and amount which is based on received right eye transform information and ii) a second fill operation; and
    wherein said scaling of said decoded left eye image and said decoded right eye image is by a first amount, said first amount being an amount indicated by said geometric recovery data, said geometric recovery data being received: i) with at least one of said encoded left eye image and said encoded right eye image or ii) prior to said encoded left and right eye images being received.

2. The method of claim 1,
    wherein scaling said decoded left eye image includes scaling the decoded left eye image in accordance with a scaling factor indicated in said geometric recovery data to reduce the size of the decoded left eye image.

3. The method of claim 1, further comprising:
    transmitting said left and right eye output images to a display device.

4. The method of claim 3,
    wherein said left eye output image is the same size as said encoded left eye image, and
    wherein said right eye output image is the same size as said encoded right eye image.

5. The method of claim 4, wherein said encoded left eye image is the same size as said encoded right eye image.

6. The method of claim 2,
    wherein performing an inverse left eye transform further includes:
        performing a preliminary inverse left eye transform operation prior to performing said first fill operation; and
    wherein performing an inverse right eye transform further includes:
        performing a preliminary inverse right eye transform operation prior to performing said second fill operation.

7. The method of claim 5, wherein said preliminary inverse left eye transform operation includes one of: a null transform, shifting transform, anamorphic scaling transform, keystone transform or warping transform.

8. An apparatus configured to process encoded stereoscopic image data the apparatus comprising:
    a processor configured to:
        receive geometric recovery data corresponding to a stereoscopic frame pair;
        receive an encoded left eye image of the stereoscopic frame pair;
        receive an encoded right eye image of the stereoscopic frame pair;
        decode said encoded left eye image of the stereoscopic frame pair to produce a decoded left eye image;
        scale said decoded left eye images to generate a scaled decoded left eye image;
        perform an inverse left eye transform on said scaled decoded left eye image to generate a left eye output image, wherein performing an inverse left eye transform includes performing both: i) a shift in a direction and amount which is based on received left eye transform information and ii) a first fill operation;
        decode said encoded right eye image of the stereoscopic frame pair to produce a decoded right eye image;

scale said decoded right eye image to generate a scaled decoded right eye image;

perform an inverse right eye transform on said scaled decoded right eye image to generate a right eye output image, wherein performing an inverse right eye transform includes performing both: i) a shift in a direction and amount which is based on received right eye transform information and ii) a second fill operation; and wherein said scaling of said decoded left eye image and said decoded right eye image is by a first amount, said first amount being an amount indicated by said geometric recovery data, said geometric recovery data being received: i) with at least one of said encoded left eye image and said encoded right eye image or ii) prior to said encoded left and right eye images being received; and a memory coupled to said processor.

9. A playback device comprising:

a receiver configured to receive i) geometric recovery data corresponding to a stereoscopic frame pair, ii) an encoded left eye image of the stereoscopic frame pair, and iii) an encoded right eye image of the stereoscopic frame pair; and a processor configured to control the playback device to:

decode said encoded left eye image to produce a decoded left eye image;

scale said decoded left eye images to generate a scaled decoded left eye image; and perform an inverse left eye transform on said scaled decoded left eye image to generate a left eye output image, wherein performing an inverse left eye transform includes performing both: i) a shift in a direction and amount which is based on received left eye transform information and ii) a first fill operation;

decode said encoded right eye image of the stereoscopic frame pair to produce a decoded right eye image;

scale said decoded right eye image to generate a scaled decoded right eye image;

perform an inverse right eye transform on said scaled decoded right eye image to generate a right eye output image, wherein performing an inverse right eye transform includes performing both: i) a shift in a direction and amount which is based on received right eye transform information and ii) a second fill operation; and wherein said scaling of said decoded left eye image and said decoded right eye image is by a first amount, said first amount being an amount indicated by said geometric recovery data, said geometric recovery data being received: i) with at least one of said encoded left eye image and said encoded right eye image or ii) prior to said encoded left and right eye images being received.

10. The playback device of claim 9, wherein the geometric recovery data includes scaling information and image shift information.

11. The playback device of 10, wherein the processor is configured to: shift the decoded left eye image by an amount indicated by received information as part of performing an inverse left eye transform.

12. The playback device of claim 9, wherein said geometric recovery data indicates a scaling factor to be used to scale the decoded left eye image to generate a smaller scaled version of said decoded left eye image.

13. The method of claim 1, wherein the inverse right eye transform includes a shift in a direction which is different from the direction of the shift performed as part of the inverse left eye transform.

* * * * *